United States Patent
Samovar et al.

(10) Patent No.: US 8,294,549 B2
(45) Date of Patent: Oct. 23, 2012

(54) APPARATUS FOR ACCESS CONTROL AND PROCESSING

(75) Inventors: Kerry Samovar, Encino, CA (US);
David Goldberg, Los Angeles, CA (US);
Paul LaFontaine, London (GB)

(73) Assignee: Ticketmaster LLC, West Hollywood, CA (US)

( * ) Notice: Subject to any disclaimer, the term of this patent is extended or adjusted under 35 U.S.C. 154(b) by 1143 days.

(21) Appl. No.: 11/744,594

(22) Filed: May 4, 2007

(65) Prior Publication Data

US 2007/0276944 A1 Nov. 29, 2007

Related U.S. Application Data

(60) Provisional application No. 60/798,903, filed on May 9, 2006.

(51) Int. Cl.
| | |
|---|---|
| *G05B 19/00* | (2006.01) |
| *G06Q 10/00* | (2012.01) |
| *G06F 21/00* | (2006.01) |
| *G06K 9/00* | (2006.01) |
| *G07B 15/02* | (2011.01) |

(52) U.S. Cl. ............. 340/5.2; 705/5; 705/6; 705/26.1; 713/185; 382/117; 382/115; 382/116; 382/118; 235/384; 235/379

(58) Field of Classification Search .................. None
See application file for complete search history.

(56) References Cited

U.S. PATENT DOCUMENTS

| 3,622,995 | A | | 11/1969 | Dilks |
| 3,581,072 | A | | 5/1971 | Nymeyer |
| 4,210,899 | A | * | 7/1980 | Swonger et al. ............ 382/125 |
| 4,412,287 | A | | 10/1983 | Braddock, III |
| 4,603,232 | A | | 7/1986 | Kurland et al. |
| 4,788,643 | A | | 11/1988 | Trippe et al. |
| 4,789,928 | A | | 12/1988 | Fujisaki |
| 4,799,156 | A | | 1/1989 | Shavit et al. |

(Continued)

FOREIGN PATENT DOCUMENTS

EP 0828223 A2 3/1998

(Continued)

OTHER PUBLICATIONS

Fan Asylum. Dave Koz Tour [online], Feb. 13, 2005 [retrievec119 January 11-482007 (Jan. 19, 2008)]. Retrieved from the Internet: URL: <http://web.archive.org/web/20050213095438/http://www.davekoz.com/tour/policy.shtml>.*

(Continued)

*Primary Examiner* — Jennifer Mehmood
*Assistant Examiner* — Fekadeselassie Girma
(74) *Attorney, Agent, or Firm* — Knobbe, Martens, Olson & Bear LLP

(57) ABSTRACT

The present invention relates to methods and systems for providing secure access control to a facility. An access control system comprises a scanner located adjacent to a venue entrance. A computer system is coupled to the scanner. The computer system is configured to receive a coded user identification data scanned from an admission ticket from a ticket bearer via the scanner, decode the coded user identification data, and transmit the decoded user identification to a terminal for display to a gate keeper so that the gate keeper can determine whether the ticket bearer is to be admitted. An optional turnstile is coupled to the computer system, wherein the computer system enables the turnstile rotation.

79 Claims, 8 Drawing Sheets

U.S. PATENT DOCUMENTS

| | | | |
|---|---|---|---|
| 4,816,904 A | 3/1989 | McKenna et al. |
| 4,845,739 A | 7/1989 | Katz |
| 4,862,357 A | 8/1989 | Ahlstrom et al. |
| 4,889,280 A | 12/1989 | Gradl et al. |
| 4,980,826 A | 12/1990 | Wagner |
| 5,077,665 A | 12/1991 | Silverman et al. |
| 5,095,196 A | 3/1992 | Miyata |
| 5,101,353 A | 3/1992 | Lupien et al. |
| 5,112,050 A | 5/1992 | Koza et al. |
| 5,136,501 A | 8/1992 | Silverman et al. |
| 5,181,786 A | 1/1993 | Hujink |
| 5,237,499 A | 8/1993 | Garback |
| 5,239,480 A | 8/1993 | Huegel |
| 5,253,165 A | 10/1993 | Leiseca et al. |
| 5,265,916 A | 11/1993 | Coe |
| 5,283,734 A | 2/1994 | Van Kohorn |
| 5,311,425 A | 5/1994 | Inada |
| 5,329,589 A | 7/1994 | Fraser et al. |
| 5,333,257 A | 7/1994 | Merrill et al. |
| 5,347,306 A | 9/1994 | Nitta |
| 5,408,417 A | 4/1995 | Wilder |
| 5,422,809 A | 6/1995 | Griffin et al. |
| 5,426,281 A | 6/1995 | Abecassis |
| 5,428,778 A | 6/1995 | Brookes |
| 5,475,585 A | 12/1995 | Bush |
| 5,489,096 A | 2/1996 | Aron |
| 5,496,991 A | 3/1996 | Delfer et al. |
| 5,518,239 A | 5/1996 | Johnston |
| 5,553,145 A | 9/1996 | Micali |
| 5,557,518 A | 9/1996 | Rosen |
| 5,559,707 A | 9/1996 | DeLorme et al. |
| 5,592,375 A | 1/1997 | Salmon et al. |
| 5,598,477 A | 1/1997 | Berson |
| 5,664,115 A | 9/1997 | Fraser |
| 5,724,520 A | 3/1998 | Goheen |
| 5,737,363 A | 4/1998 | Dinkins |
| 5,742,763 A | 4/1998 | Jones |
| 5,754,654 A | 5/1998 | Hiroya et al. |
| 5,757,917 A | 5/1998 | Rose et al. |
| 5,774,873 A | 6/1998 | Berent et al. |
| 5,794,207 A | 8/1998 | Walker et al. |
| 5,794,210 A | 8/1998 | Goldhaber et al. |
| 5,794,219 A | 8/1998 | Brown |
| 5,797,126 A | 8/1998 | Helbling et al. |
| 5,812,670 A | 9/1998 | Micali |
| 5,818,914 A | 10/1998 | Fujisaki |
| 5,826,241 A | 10/1998 | Stein et al. |
| 5,835,896 A | 11/1998 | Fisher et al. |
| 5,845,265 A | 12/1998 | Woolston |
| 5,845,266 A | 12/1998 | Lupien et al. |
| 5,850,442 A | 12/1998 | Muftic |
| 5,890,138 A | 3/1999 | Godin et al. |
| 5,918,209 A | 6/1999 | Campbell et al. |
| 5,930,761 A | 7/1999 | O'Toole |
| 6,023,685 A | 2/2000 | Brett et al. |
| 6,023,686 A | 2/2000 | Brown |
| 6,026,383 A | 2/2000 | Ausubel |
| 6,044,363 A | 3/2000 | Mori et al. |
| 6,047,264 A | 4/2000 | Fisher et al. |
| 6,048,271 A | 4/2000 | Barcelou |
| 6,067,532 A | 5/2000 | Gebb |
| 6,070,146 A | 5/2000 | Mimata |
| 6,082,620 A | 7/2000 | Bone, Jr. |
| 6,085,164 A | 7/2000 | Smith et al. |
| 6,085,169 A | 7/2000 | Walker et al. |
| 6,085,976 A | 7/2000 | Sehr |
| 6,094,640 A | 7/2000 | Goheen |
| 6,107,932 A | 8/2000 | Walker et al. |
| 6,119,096 A * | 9/2000 | Mann et al. ............... 705/5 |
| 6,119,945 A | 9/2000 | Muller et al. |
| 6,175,922 B1 | 1/2001 | Wang et al. |
| 6,192,349 B1 | 2/2001 | Husemann et al. |
| 6,216,227 B1 | 4/2001 | Goldstein et al. |
| 6,223,166 B1 | 4/2001 | Kay |
| 6,230,146 B1 | 5/2001 | Alaia et al. |
| 6,240,396 B1 | 5/2001 | Walker et al. |
| 6,243,691 B1 | 6/2001 | Fisher et al. |
| 6,246,996 B1 | 6/2001 | Stein et al. |
| 6,308,159 B1 | 10/2001 | Strohl |
| 6,341,353 B1 | 1/2002 | Herman et al. |
| 6,418,415 B1 | 7/2002 | Walker et al. |
| 6,434,398 B1 | 8/2002 | Inselberg |
| 6,446,045 B1 | 9/2002 | Stone et al. |
| 6,446,917 B2 | 9/2002 | Dieckmann et al. |
| 6,449,346 B1 | 9/2002 | Katz |
| 6,466,917 B1 | 10/2002 | Goyal et al. |
| 6,470,451 B1 | 10/2002 | Weinstein |
| 6,477,503 B1 | 11/2002 | Mankes |
| 6,484,153 B1 | 11/2002 | Walker et al. |
| 6,496,809 B1 | 12/2002 | Nakfoor |
| 6,523,037 B1 | 2/2003 | Monahan et al. |
| 6,603,568 B1 | 8/2003 | Sansone |
| 6,604,107 B1 | 8/2003 | Wang |
| 6,658,390 B1 | 12/2003 | Walker et al. |
| 6,662,230 B1 | 12/2003 | Eichstaedt et al. |
| 6,679,421 B2 | 1/2004 | Shin et al. |
| 6,685,093 B2 | 2/2004 | Challa et al. |
| 6,690,794 B1 | 2/2004 | Terao et al. |
| 6,704,713 B1 | 3/2004 | Brett et al. |
| 6,736,322 B2 | 5/2004 | Gobburu et al. |
| 6,820,201 B1 | 11/2004 | Lincoln et al. |
| 6,842,741 B1 | 1/2005 | Fujimura |
| 6,850,901 B1 * | 2/2005 | Hunter et al. ............... 705/26 |
| 6,854,651 B2 | 2/2005 | Smith et al. |
| 6,877,661 B2 | 4/2005 | Webb et al. |
| 6,877,665 B2 | 4/2005 | Challa et al. |
| 6,901,429 B2 | 5/2005 | Dowling |
| 6,907,405 B2 | 6/2005 | Brett |
| 6,910,019 B2 | 6/2005 | Dorr |
| 6,910,627 B1 | 6/2005 | Simpson-Young et al. |
| 6,920,428 B2 | 7/2005 | Greene |
| 6,937,998 B1 * | 8/2005 | Swartz et al. ............... 705/26 |
| 6,944,599 B1 | 9/2005 | Vogel et al. |
| 6,963,854 B1 | 11/2005 | Boyd et al. |
| 6,965,914 B2 | 11/2005 | Dowling |
| 6,999,936 B2 | 2/2006 | Sehr |
| 7,003,485 B1 | 2/2006 | Young |
| 7,004,388 B2 | 2/2006 | Kohita |
| 7,010,494 B2 | 3/2006 | Etzioni et al. |
| 7,031,945 B1 | 4/2006 | Donner |
| 7,044,362 B2 | 5/2006 | Yu |
| 7,058,602 B1 | 6/2006 | La Mura et al. |
| 7,069,243 B2 | 6/2006 | Dinwoodie |
| 7,076,460 B2 | 7/2006 | Dinwoodie |
| 7,076,558 B1 | 7/2006 | Dunn |
| 7,080,026 B2 | 7/2006 | Singh et al. |
| 7,080,030 B2 | 7/2006 | Eglen et al. |
| 7,080,328 B1 | 7/2006 | Sawyer |
| 7,080,882 B2 | 7/2006 | Stitt |
| 7,083,081 B2 | 8/2006 | McGee et al. |
| 7,085,818 B2 | 8/2006 | Brown et al. |
| 7,092,892 B1 | 8/2006 | Sobalvarro et al. |
| 7,093,130 B1 | 8/2006 | Kobayashi et al. |
| 7,099,841 B1 | 8/2006 | Hall et al. |
| 7,110,960 B2 | 9/2006 | Phillips et al. |
| 7,114,179 B1 | 9/2006 | Ritter et al. |
| 7,127,404 B1 | 10/2006 | Poon |
| 7,127,408 B2 | 10/2006 | Rosen |
| 7,133,848 B2 | 11/2006 | Phillips et al. |
| 7,139,916 B2 | 11/2006 | Billingsley et al. |
| 7,149,549 B1 | 12/2006 | Ortiz et al. |
| 7,152,043 B2 | 12/2006 | Alaia et al. |
| 7,159,778 B1 | 1/2007 | Kochevar et al. |
| 7,162,454 B1 | 1/2007 | Donner et al. |
| 7,191,147 B2 | 3/2007 | Heene et al. |
| 7,333,943 B1 | 2/2008 | Charuk et al. |
| 7,455,224 B2 | 11/2008 | Kochevar et al. |
| 7,475,138 B2 * | 1/2009 | Graveline et al. ............. 709/225 |
| 7,584,123 B1 | 9/2009 | Karonis et al. |
| RE43,157 E * | 2/2012 | Bishop et al. ................. 235/379 |
| 2001/0018660 A1 | 8/2001 | Sehr |
| 2001/0034687 A1 | 10/2001 | Bushonville et al. |
| 2001/0049652 A1 | 12/2001 | Nakajima |
| 2002/0004762 A1 | 1/2002 | Izumoto |
| 2002/0023955 A1 | 2/2002 | Frank et al. |
| 2002/0040308 A1 | 4/2002 | Hasegawa et al. |
| 2002/0040346 A1 | 4/2002 | Kwan |

| | | | |
|---|---|---|---|
| 2002/0042729 A1 | 4/2002 | Yajima et al. | |
| 2002/0052758 A1 | 5/2002 | Arthur et al. | |
| 2002/0052965 A1 | 5/2002 | Dowling | |
| 2002/0062265 A1 | 5/2002 | Poon | |
| 2002/0065763 A1 | 5/2002 | Taylor et al. | |
| 2002/0065783 A1 | 5/2002 | Na et al. | |
| 2002/0072999 A1 | 6/2002 | Andres et al. | |
| 2002/0082879 A1 | 6/2002 | Miller et al. | |
| 2002/0082969 A1 | 6/2002 | O'Keefe et al. | |
| 2002/0087456 A1 | 7/2002 | Abeshouse et al. | |
| 2002/0091555 A1 | 7/2002 | Leppink | |
| 2002/0094090 A1 | 7/2002 | Iino | |
| 2002/0095357 A1 | 7/2002 | Hunter et al. | |
| 2002/0095383 A1* | 7/2002 | Mengin et al. | 705/50 |
| 2002/0099831 A1 | 7/2002 | Tsunogai | |
| 2002/0103849 A1 | 8/2002 | Smith | |
| 2002/0107779 A1 | 8/2002 | Maltzman | |
| 2002/0116343 A1 | 8/2002 | Nakamura et al. | |
| 2002/0128922 A1 | 9/2002 | Joao | |
| 2002/0138325 A1 | 9/2002 | Mashimo et al. | |
| 2002/0138751 A1 | 9/2002 | Dutta | |
| 2002/0138770 A1 | 9/2002 | Dutta | |
| 2002/0138771 A1* | 9/2002 | Dutta | 713/202 |
| 2002/0143860 A1 | 10/2002 | Catan | |
| 2002/0156715 A1 | 10/2002 | Wall et al. | |
| 2002/0169623 A1 | 11/2002 | Call et al. | |
| 2002/0178093 A1 | 11/2002 | Dean et al. | |
| 2002/0178226 A1 | 11/2002 | Anderson et al. | |
| 2002/0188523 A1 | 12/2002 | Hyyppa et al. | |
| 2002/0188551 A1 | 12/2002 | Grove et al. | |
| 2003/0023500 A1 | 1/2003 | Boies et al. | |
| 2003/0024988 A1 | 2/2003 | Stanard | |
| 2003/0040943 A1 | 2/2003 | Bates et al. | |
| 2003/0061303 A1 | 3/2003 | Brown et al. | |
| 2003/0067464 A1 | 4/2003 | Gathman et al. | |
| 2003/0069762 A1 | 4/2003 | Gathman et al. | |
| 2003/0069763 A1 | 4/2003 | Gathman et al. | |
| 2003/0069764 A1 | 4/2003 | Gathman et al. | |
| 2003/0069789 A1 | 4/2003 | Gathman et al. | |
| 2003/0069810 A1 | 4/2003 | Gathman et al. | |
| 2003/0069827 A1 | 4/2003 | Gathman et al. | |
| 2003/0069829 A1 | 4/2003 | Gathman et al. | |
| 2003/0105641 A1 | 6/2003 | Lewis | |
| 2003/0120502 A1 | 6/2003 | Robb et al. | |
| 2003/0154142 A1 | 8/2003 | Ginsburg et al. | |
| 2003/0154169 A1 | 8/2003 | Yanai | |
| 2003/0163373 A1 | 8/2003 | Cornateanu | |
| 2003/0163708 A1* | 8/2003 | Tang | 713/185 |
| 2003/0164400 A1 | 9/2003 | Boyd | |
| 2003/0171960 A1 | 9/2003 | Skinner | |
| 2003/0177022 A1 | 9/2003 | Francis | |
| 2003/0187802 A1 | 10/2003 | Booth | |
| 2003/0229790 A1 | 12/2003 | Russell | |
| 2003/0236736 A1 | 12/2003 | Harmon et al. | |
| 2004/0002894 A1* | 1/2004 | Kocher | 705/13 |
| 2004/0006497 A1* | 1/2004 | Nestor et al. | 705/5 |
| 2004/0019571 A1 | 1/2004 | Hurwitz et al. | |
| 2004/0039635 A1 | 2/2004 | Linde et al. | |
| 2004/0039696 A1 | 2/2004 | Harmon et al. | |
| 2004/0049412 A1 | 3/2004 | Johnson | |
| 2004/0073439 A1 | 4/2004 | Shuster | |
| 2004/0083156 A1 | 4/2004 | Schulze | |
| 2004/0086257 A1 | 5/2004 | Werberig et al. | |
| 2004/0093175 A1 | 5/2004 | Tan | |
| 2004/0104097 A1* | 6/2004 | Ngee | 194/210 |
| 2004/0111303 A1 | 6/2004 | Francis | |
| 2004/0128257 A1 | 7/2004 | Okamoto et al. | |
| 2004/0128516 A1 | 7/2004 | Okamoto et al. | |
| 2004/0138962 A1 | 7/2004 | Kopelman et al. | |
| 2004/0172270 A1 | 9/2004 | Sugimoto et al. | |
| 2004/0204990 A1 | 10/2004 | Lee et al. | |
| 2004/0204991 A1 | 10/2004 | Monahan et al. | |
| 2004/0215527 A1 | 10/2004 | Grove et al. | |
| 2004/0220821 A1 | 11/2004 | Ericsson et al. | |
| 2005/0001711 A1 | 1/2005 | Doughty et al. | |
| 2005/0015303 A1 | 1/2005 | Dubin et al. | |
| 2005/0015308 A1 | 1/2005 | Grove et al. | |
| 2005/0021364 A1 | 1/2005 | Nakfoor | |
| 2005/0021365 A1 | 1/2005 | Nakfoor | |
| 2005/0027608 A1 | 2/2005 | Wiesmuller et al. | |
| 2005/0027641 A1 | 2/2005 | Grove et al. | |
| 2005/0043994 A1 | 2/2005 | Walker et al. | |
| 2005/0065866 A1 | 3/2005 | Grove et al. | |
| 2005/0071245 A1 | 3/2005 | Norins, Jr. et al. | |
| 2005/0131809 A1 | 6/2005 | Watt, II et al. | |
| 2005/0139661 A1 | 6/2005 | Eglen et al. | |
| 2005/0139662 A1 | 6/2005 | Eglen et al. | |
| 2005/0140675 A1 | 6/2005 | Billingsley et al. | |
| 2005/0144115 A1 | 6/2005 | Brett | |
| 2005/0149458 A1 | 7/2005 | Eglen et al. | |
| 2005/0160020 A1 | 7/2005 | Asher et al. | |
| 2005/0165758 A1 | 7/2005 | Kasten et al. | |
| 2005/0209914 A1 | 9/2005 | Nguyen et al. | |
| 2005/0209954 A1 | 9/2005 | Asher et al. | |
| 2005/0228722 A1 | 10/2005 | Embree | |
| 2005/0240453 A1 | 10/2005 | Lyons | |
| 2005/0273405 A1 | 12/2005 | Chen | |
| 2006/0017541 A1 | 1/2006 | Nguyen | |
| 2006/0082439 A1 | 4/2006 | Bazakos et al. | |
| 2006/0085396 A1 | 4/2006 | Evans et al. | |
| 2006/0095344 A1* | 5/2006 | Nakfoor | 705/26 |
| 2006/0100985 A1 | 5/2006 | Mark et al. | |
| 2006/0105783 A1 | 5/2006 | Giraldin et al. | |
| 2006/0108418 A1 | 5/2006 | Rice | |
| 2006/0111967 A1 | 5/2006 | Forbes | |
| 2006/0116916 A1 | 6/2006 | Bowman et al. | |
| 2006/0124734 A1 | 6/2006 | Wallerstorfer et al. | |
| 2006/0140374 A1 | 6/2006 | Light et al. | |
| 2006/0143094 A1 | 6/2006 | Kohout et al. | |
| 2006/0143109 A1 | 6/2006 | Goel | |
| 2006/0143698 A1 | 6/2006 | Ohara | |
| 2006/0144946 A1 | 7/2006 | Kuriyama et al. | |
| 2006/0148566 A1 | 7/2006 | Lakshminarasimha | |
| 2006/0155659 A1 | 7/2006 | DiCesare | |
| 2006/0161474 A1 | 7/2006 | Diamond et al. | |
| 2006/0167756 A1 | 7/2006 | VonBergen et al. | |
| 2006/0178930 A1 | 8/2006 | Kim | |
| 2006/0190387 A1 | 8/2006 | Molloy | |
| 2006/0190388 A1 | 8/2006 | Molloy | |
| 2006/0190389 A1 | 8/2006 | Molloy | |
| 2006/0190390 A1 | 8/2006 | Molloy | |
| 2006/0195356 A1 | 8/2006 | Nerenhausen et al. | |
| 2006/0232110 A1 | 10/2006 | Ovadia | |
| 2006/0244564 A1 | 11/2006 | Madsen | |
| 2006/0249572 A1 | 11/2006 | Chen et al. | |
| 2006/0271462 A1 | 11/2006 | Harmon | |
| 2006/0277130 A1 | 12/2006 | Harmon | |
| 2006/0293929 A1 | 12/2006 | Wu et al. | |
| 2006/0293994 A1 | 12/2006 | Stuart | |
| 2007/0012765 A1 | 1/2007 | Trinquet et al. | |
| 2007/0017979 A1 | 1/2007 | Wu et al. | |
| 2007/0055554 A1 | 3/2007 | Sussman et al. | |
| 2007/0143194 A1 | 6/2007 | Fraser et al. | |
| 2008/0154623 A1* | 6/2008 | Derker et al. | 705/1 |
| 2009/0030744 A1 | 1/2009 | Yamada | |
| 2009/0101708 A1 | 4/2009 | Kochevar et al. | |

FOREIGN PATENT DOCUMENTS

| | | |
|---|---|---|
| EP | 1 054 335 A2 | 11/2000 |
| EP | 1069539 A2 | 1/2001 |
| JP | 53 142300 A | 12/1978 |
| JP | 5266049 | 10/1993 |
| JP | 11031204 A | 2/1999 |
| JP | 2001236459 A | 8/2001 |
| WO | WO 88/03295 | 5/1988 |
| WO | WO 98/10361 | 3/1998 |
| WO | WO 99/06928 | 2/1999 |
| WO | WO 99/18533 | 4/1999 |
| WO | WO 99/38129 | 7/1999 |
| WO | WO 99/60489 | 11/1999 |
| WO | WO 00/28485 | 5/2000 |
| WO | WO 00/62260 | 10/2000 |
| WO | WO 00/74300 A1 | 12/2000 |
| WO | WO 00/75838 A1 | 12/2000 |
| WO | WO 01/03040 A1 | 1/2001 |
| WO | WO 01/08065 A1 | 2/2001 |
| WO | WO 01/41021 A1 | 6/2001 |
| WO | WO 01/41085 A2 | 6/2001 |

| | | |
|---|---|---|
| WO | WO 01/44892 A2 | 6/2001 |
| WO | WO 01/52139 A1 | 7/2001 |
| WO | WO 01/59649 A1 | 8/2001 |
| WO | WO 01/59658 A1 | 8/2001 |
| WO | WO 01/71669 | 9/2001 |
| WO | WO 01/84473 | 11/2001 |
| WO | WO 02/03174 | 1/2002 |
| WO | WO 02/35322 A2 | 5/2002 |
| WO | WO 03/027808 A2 | 4/2003 |

OTHER PUBLICATIONS

Fan Asylum, Dave Koz [online], Feb. 13, 2005; Retrieved from internet—URL: http://web.archive.org/web/20050213095438/http://www.davekoz.com/tour/policy.shtml.
International Search Report and Written Opinion (mailing date: Mar. 12, 2008); International Application No. PCT/US07/10922, filing date: May 4, 2007.
Article from Website; Tech Web; "Byter Up: Ballparks Go High-Tech"; Mar. 31, 1999 (4 pages).
Happel, et al.; "Creating a Futures Market for Major Event Tickets: Problems and Prospects"; *Cato Journal*, vol. 21, No. 3; 2002 (pp. 443-461).
"Acteva and Enspot.com Sign Agreement to Provide On-Line Ticketing, Broader Distribution", Business Wire (Dec. 3, 1999).
"AuctionNet Still One-Of-A-Kind", Automotive News, S12 (Sep. 20, 1993).
"Cathay Pacific Airways Auctions a Boeing 747-400 Worth of Seats in Third Cybertraveler Auction", Business Wire (Apr. 29, 1996).
"Cathay Pacific Airways-USA Receives More than 1,300 Bids During First Five Days of CyberAuction", Business Wire (Oct. 18, 1995).
"Cathay Pacific Airways-USA to Hold First-Ever Internet CyberAuction", Business Wire (Sep. 26, 1995).
"E-TicketBoard Launches PSL Xchange for Eight NFL Teams", PR Newswire (Jul. 18, 2000).
"E-TicketBoard Launches Revolutionary New Site—SeatsandSuites", PR Newswire (Oct. 17, 2000).
"Keyware Unveils Multi-Application Smart Card Suite", Card News, vol. 16, No. 10 (May 30, 2001).
"Online Movie Ticket Site Launched in China", China Online (Dec. 23, 1999).
"OnSale Brings Thrill of the Auction to the Web", Link-up p. 34 (Jul./Aug. 1995).
"Season Ticket Solutions Announces Availability of Ticket Exchange for Sporting Teams and Entertainment Venues", Business Wire (Jul. 30, 2001).
"WBGH to Hold Online Computer Auction", Link-Up, p. 10 (Sep./Oct. 1988).
Banâtre, "Distributed Auction Bidding System", International Computing Symposium, vol. 4, No. 4 (Aug. 1981).
Banks, "PSL Put Owners on the Hot Seat", St. Petersburg Times, p. 10C (Oct. 31, 1993).
Beam et al, "Electronic Negotiation through Internet-Based Auctions", CITM Working Paper 96-WP-1019, http://haas.berkeley.edu/citm/publications/papers/wp-1019.pdf (Dec. 1996).
Blau, "Dormitories See Departure from Previous Years' Trends", The Tech, vol. 116, No. 38 (Aug. 30, 1996).
Boyes et al, "Auctions as an Allocation Mechanism in Academia: The Case of Faculty Offices", Journal of Economic Perspectives, vol. 3, No. 3, pp. 37-40 (Summer 1989).
Collier, "Columbia, S.C.-Based Internet Firm Helps Buy, Sell Sports Tickets", The State, (Oct. 23, 2000).
Dickey, "Raider PSL Without Permanent Place", San Francisco Chronicle, p. B2 (Jun. 26, 1997).
Dickey, "Raiders' PSLs May Be for Life", San Francisco Chronicle, p. D5 (Mar. 26, 1997).
Garza, "Space Cruise", Reason (May 2000).
Harlan, "At Least it isn't the Team's Ball that's in Somebody Else's Court", Wall Street Journal (Jun. 4, 1991).
Holbrook, "Oakland, Calif., Professional Football Team Sees Gain in Seat License Sales", Contra Costa Times (Feb. 26, 2001).
Hylton, "Dorm Lottery Starts Strong", The Tech, vol. 114, No. 34 (Aug. 29, 1994).

Jackson, "Media Futures: This Bazaar Could Put Retailers Under the Hammer", Financial Times (May 25, 1995).
Jenkins, "Giants Draw Fans into Web Team Helps Season-Ticket Holders Get Mileage Out of Plans", USA Today, p. 3C (Jun. 27, 2000).
Kasper, "Purchase Griz Playoff Tickets Now", Missoulian Online (May 3, 2001).
Koenig, "Texas Firm Links Sports Teams, Fans", Amarillo Globe-News, Feb. 20, 2000).
Kravets, "Going, Going, Gone! Real Estate Auctions in the 90s", Probate & Property, p. 38 (May/Jun. 1993).
Kroll et al, "The Commodity Futures Market Guide", Harper and Row, pp. 9-10 (1973).
Kumar, "With Stars in their Eyes, Travelers Look to Space", St. Petersburg Times, p. 1A (Jun. 11, 2000).
Labuszewski et al, "Inside the Commodity Option Markets", John Wiley & Sons, pp. 19-21 (1985).
Liao, "Sloan's Class Priority System Set to Go", The Tech, vol. 116, No. 25 (May 10, 1996).
Martin, "LiquidSeats Helps Fill the House, Sans Scalping" cnn.com, (Dec. 14, 2000).
Matsumoto et al, "Feasibility of Space Tourism 'Cost Study for Space Tour'", Proceedings of 40th IAF Congress, Paper IAF-89-700 (1989).
Menezes et al, "Simultaneous Pooled Auctions", The Journal of Real Estate Finance and Economics, vol. 17(3), pp. 219-232 (Nov. 19, 1996).
Moldovanu et al, "The Optimal Allocation of Prizes in Contests", http://www.sfb504.uni-mannheim.de/publications/dp99-75.pdf (Jul. 14, 1999).
Nestor et al, "Transforming Tickets from a Commodity into a Valuable Strategic Asset", Global eTicket Exchange whitepaper, Oct. 13, 2000.
O'Neil, "Q and A", St. Louis Post-Dispatch, p. 4D (Jan. 19, 1995).
Riley et al, "Optimal Auctions", The American Economic Review, vol. 71, No. 3, pp. 381-392 (Jun. 1981).
Rosen et al, "Ticket Pricing", University of Chicago Center for the Study of the Economy and the State (Sep. 1995).
Rubel, "ETM to Ticketmaster: Let's Rock", Marketing News (Jun. 19, 1995).
Stevenson, "Frosh Get at Least Fifth Choice Dorm: Women Find Shortage of Single-Sex Rooms", The Tech, vol. 115, No. 37 (Aug. 31, 1995).
Thomas, "Deadline Looms for Playoff Tickets; PSL Owners Have Until Dec. 8 to Make Purchase", St. Louis Post-Dispatch, p. D8 (Dec. 3, 1999).
Vanderporten, "Strategic Behavior in Pooled Condominium Auctions", Journal of Urban Economics 31, pp. 123-137 (1992).
Waddell, "Advantix, Tickets.com Hope Merger Brings Best of Both Ticketing Worlds", Amusement Business (Feb. 8, 1999).
Wagner, "How Retailers are Using Web Auctions to Let Customers Help Them Set Prices", http://www.internetretailer.com/printArticle.asp?id=3164 (Mar. 2001).
www.TicketOptions.com Web Pages, as retreived from archive.org (2001).
wwwSeasonTicket.com Web Pages, as retreived from archive.org (2001).
Zoltak, "Advantix Acquisitions Continue with Protix Deal", Amusement Business (Nov. 2, 1998).
Office Action mailed on Aug. 2, 2007 in U.S. Appl. No. 11/453,286.
Office Action mailed on Jul. 27, 2007 in U.S. Appl. No. 11/475,733.
International Search Report for PCT Application—PCT /US06/10295, mailing date Sep. 14, 2007.
Hes, et al. "At Face Value" On biometrical identification and privacy, Registratiekamer, Sep. 1999; 78 pages.
Fujimura, "XML Ticket: Generalized Digital Ticket Definition Language", The W3C Signed XML Workshop—Copyright © 1999, 33 pages.
Matsuyama, et al. "Distributed Digital-Ticket Management for Rights Trading System", E-Commerce, 1999; pp. 110-118.
In, Shirley Siu Weng, "*A Proposed* Electronic Ticket Management for trading Service in Internet", Feb. 9, 2001; 7 pages.

Article from Smart Card News, "Major Players Form Proton World International", Aug. 1998, pp. 141-160.

Fujimura, et al. "General-purpose Digital Ticket Framework", NTT Information and Communication Systems Labs, USENIX Workshop on Electronic Commerce; Aug. 31-Sep. 1998.

Fujimura, et al. "Digital-Ticket-Controlled Digital Ticket Circulation", NTT Information Sharing Platform Laboratories, USENIX Security Symposium, Aug. 23-26, 1999.

Chui, et al. "Auction on the Internate—A Preliminary Study", Department of Marketing, HK Univiersity of Science and Technology; 1999, pp. 1-7.

Asokan, et al. "SEMPER Consortium: Advanced Services, Architecture and Design", Deliverable D10 of ACTS Project AC026, Mar. 15, 1999.

U.S. Appl. No. 09/702,794, filed Nov. 1, 2000.

Office Action in U.S. Appl. No. 11/453,286, mailed Nov. 5, 2007.

Pelline, "Cathay Pacific to Auction Off Airline Tickets on the Internet", San Francisco Chronicle, p. C4 (Apr. 30, 1996).

Article from Website: Sports Venue Technology, "Pacific Bell Park, San Francisco," printed on Mar. 22, 2007 (5 pages).

* cited by examiner

FIG. 4

PLEASE PROVIDE AT LEAST ONE OF THE FOLLOWING PIECES OF IDENTIFICATION INFORMATION FOR: JANE DOE

DRIVER LICENSE NUMBER (ISSUED BY STATE OR FEDERAL GOVERNMENT) — ENTER LICENSE NUMBER | STATE

STATE IDENTIFICATION NUMBER — ENTER LICENSE NUMBER | STATE

PASSPORT NUMBER — ENTER PASSPORT NUMBER

TWO CREDIT CARD NUMBERS — ENTER CREDIT CARD NUMBER | EXP. DATE | CSC
ENTER CREDIT CARD NUMBER | EXP. DATE | CSC

SUBMIT

FIG. 5

A TICKET HAS BEEN PURCHASED FOR YOU FOR THE ACME CONCERT AT SMITH HALL ON APRIL 28, 2006. IN ORDER FOR YOU TO RECEIVE YOUR TICKET, YOU NEED TO PROVIDE ONE OF THE FOLLOWING FOR IDENTIFICATION PURPOSES IN ORDER TO RECEIVE A TICKET

DRIVER LICENSE NUMBER (ISSUED BY STATE OR FEDERAL GOVERNMENT) — [ENTER LICENSE NUMBER] [STATE ▸]

STATE IDENTIFICATION NUMBER — [ENTER LICENSE NUMBER] [STATE ▸]

PASSPORT NUMBER — [ENTER PASSPORT NUMBER]

TWO CREDIT CARD NUMBERS — [ENTER CREDIT CARD NUMBER] [EXP. DATE] [CSC]
[ENTER CREDIT CARD NUMBER] [EXP. DATE] [CSC]

[SUBMIT]

FIG. 6

ACME CONCERT AT SMITH HALL, APRIL 28, 2006
ORCHESTRA, ROW M, SEAT 24
FIG. 7

APPARATUS FOR ACCESS CONTROL AND PROCESSING

CROSS-REFERENCE TO RELATED APPLICATIONS

The present application claims priority from U.S. Patent Application No. 60/798,903, filed May 9, 2006, the content of which is incorporated herein in its entirety.

STATEMENT REGARDING FEDERALLY SPONSORED R&D

Not applicable.

PARTIES OF JOINT RESEARCH AGREEMENT

Not applicable.

REFERENCE TO SEQUENCE LISTING, TABLE, OR COMPUTER PROGRAM LISTING

Not applicable.

COPYRIGHT RIGHTS

A portion of the disclosure of this patent document contains material that is subject to copyright protection. The copyright owner has no objection to the facsimile reproduction by any one of the patent document or the patent disclosure, as it appears in the Patent and Trademark Office patent file or records, but otherwise reserves all copyright rights whatsoever.

BACKGROUND OF THE INVENTION

1. Field of the Invention

The present invention relates to methods and systems for providing secure access control to a facility, and in particular, to systems and methods for facility access tokens.

2. Description of the Related Art

The safety and security of spectators at sports and other entertainment events is a concern of entertainment event operators. It would be desirable to verify that those attending such events are not known to be potential safety or security risks.

The resale of event tickets poses another challenge to potential event attendees and event operators, for a number of reasons including but not limited to the fact that (a) when a ticket is resold the event operator no longer knows who the new holder is, (b) consumers may be defrauded in connection with the transfer, (c) ticket scalping (i.e., the resale of a ticket for more than its face price) itself is a crime in many jurisdictions, (d) tickets sold at below market pricing, to artist fan club members, or under other special conditions are often resold to new holders who were not the intended recipients of such benefits, and (e) resale activity occurring near the entertainment venue can cause crowd control or other security problems.

SUMMARY OF THE INVENTION

An example embodiment provides an access control system, comprising: a scanner located adjacent to a venue entrance; and a computer system coupled to the scanner, the computer system configured to: receive coded user identification data scanned from an admission token from a token bearer via the scanner; decode the coded user identification data; transmit the decoded user identification to a terminal for display to a gate keeper so that the gate keeper can determine whether the token bearer is to be admitted.

An example embodiment provides a method of controlling access using a computer-based access control system, the method comprising: receiving from a user terminal over a network at the access control system a request from a user for a plurality of access permits; and providing from the access control system over the network to the user terminal a request that the user provide identification information for the intended recipients of the access permits, wherein the user is informed that one of the access permits needs to be allocated to the user.

An example embodiment provides method of controlling access using a computer-based access control system, the method comprising: receiving from a user terminal over a network at the access control system a request from a first user for the purchase of a plurality of access permits; providing from the access control system over the network to the user terminal a request that the user provide contact information for at a second user to whom a first of the plurality of access permits is to be provided; using the contact information to contact the second user with a request for one or more types of identification; and least partly in response to receiving the requested identification for the second user, providing a first access permit with a unique identifier related to the second user, wherein the unique identifier is machine readable and/or human readable.

BRIEF DESCRIPTION OF THE DRAWINGS

Embodiments of the present invention will be described with reference to the drawings summarized below. These drawings and the associated description are provided to illustrate example embodiments of the invention, and not to limit the scope of the invention.

FIG. 4 illustrates a first example user interface.
FIG. 5 illustrates a second example user interface.
FIG. 6 illustrates a third example user interface.
FIG. 7 illustrates an example event ticket.

DETAILED DESCRIPTION OF PREFERRED EMBODIMENTS

Figure 1A:
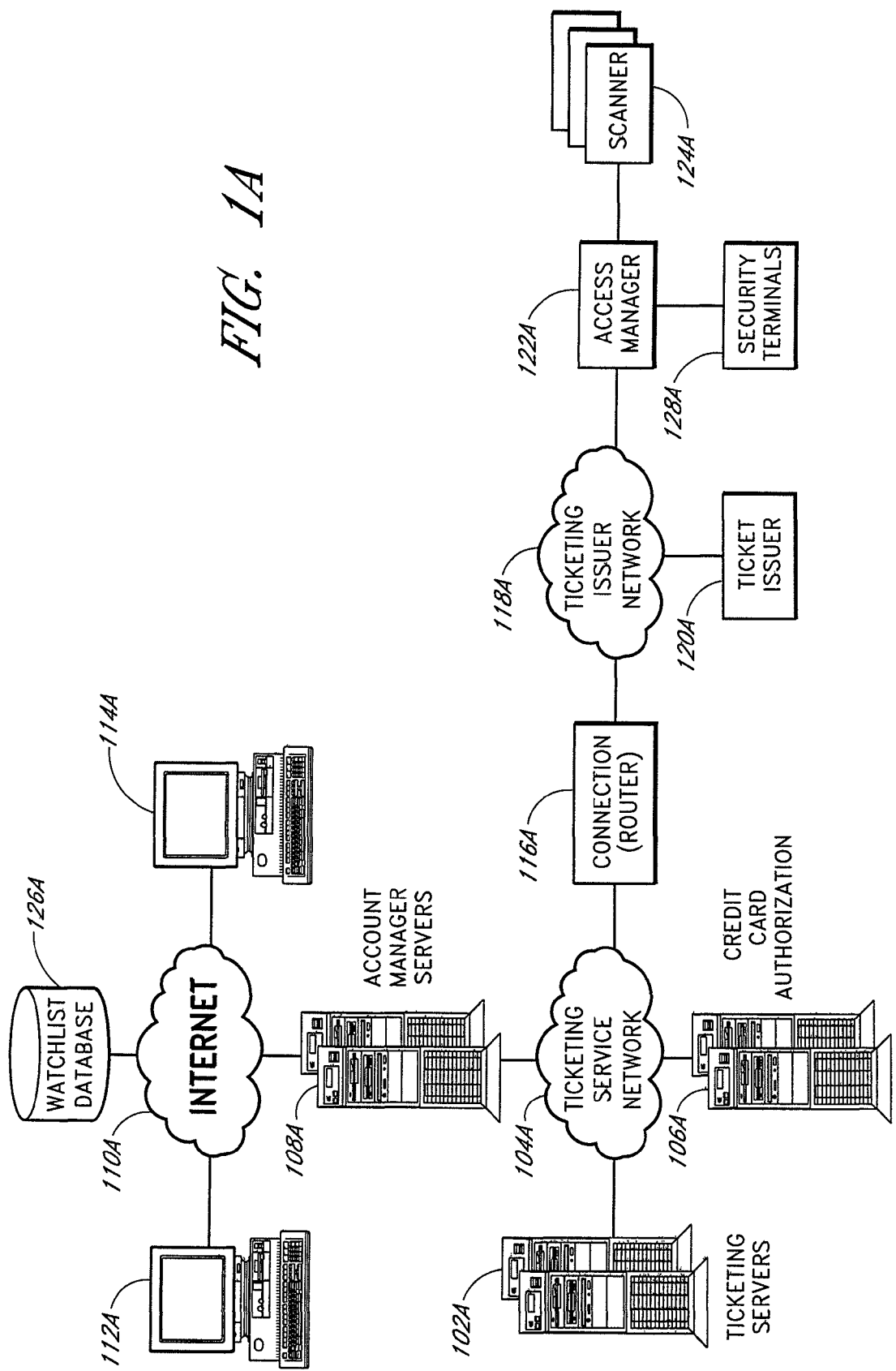
FIGS. 1A-B illustrate example networked systems.

Methods and systems are described herein for providing secure access control to a facility using facility access tokens, such as physical or electronic tickets.

Throughout the following description, the term "Web site" is used to refer to a user-accessible server site that implements the basic World Wide Web standards for the coding and transmission of hypertextual documents. These standards currently include HTML (the Hypertext Markup Language) and HTTP (the Hypertext Transfer Protocol). It should be understood that the term "site" is not intended to imply a single geographic location, as a Web or other network site can, for example, include multiple geographically-distributed computer systems that are appropriately linked together. Furthermore, while the following description relates to an embodiment utilizing the Internet and related protocols, other networks, such as networked interactive televisions, and other protocols may be used as well.

In addition, unless otherwise indicated, the functions described herein are preferably performed by software modules including executable code and instructions running on one or more general-purpose computers. The computers can include one or more central processing units (CPUs) that execute program code and process data, memory, including one or more of volatile memory, such as random access memory (RAM) for temporarily storing data and data structures during program execution, non-volatile memory, such as a hard disc drive, optical drive, or FLASH drive, for storing programs and data, including databases, which may be referred to as a "system database," and a network interface for accessing an intranet and/or Internet. In addition, the computers can include a display for displaying user interfaces, data, and the like, and one or more user input devices, such as a keyboard, mouse, pointing device, microphone and/or the like, used to navigate, provide commands, enter information, provide search queries, and/or the like. However, the present invention can also be implemented using special purpose computers, terminals, state machines, and/or hardwired electronic circuits. In addition, the example processes described herein do not necessarily have to be performed in the described sequence, and not all states have to be reached or performed.

Further, while the term "barcodes" and "barcode scanning" may be utilized herein as examples of information and identification encoding and retrieval techniques, other information bearing techniques and corresponding scanning or reading techniques can be used as well. For example, magnetic stripes, human readable codes, non-volatile memory, smart chips, and/or the like can be used to store information, including identification information, seat information, event information, ticket holder information, ticket issuer information, and the like.

Further, while the following description may refer to "clicking on" a link or button, or pressing a key in order to provide a command or make a selection, the commands or selections can also be made using other input techniques, such as using voice input, pen input, mousing or hovering over an input area, and/or the like. Further, the term "button" as referred to herein can include both software generated buttons displayed on a screen and physical keyboard buttons, as appropriate.

In an example embodiment, security-related data, such as a ticket purchaser's name and/or other identifier, is received at a computer system associated with or that is part of a computerized ticket distribution system. For example, a rule, stored in a ticket distribution system database, can require that a ticket purchaser (e.g., a ticket purchaser purchasing tickets for multiple individuals) provide (e.g., via a terminal associated with the ticket purchaser, at a ticket kiosk or at other points of purchase) the names and/or other identifiers of the individuals who will be using the tickets.

In an example embodiment, a purchaser purchases tickets (e.g., event tickets for a sporting event, concert, movie, play, fair, etc.) via one or more ticket channels, such as via a Web site associated with the ticket distribution system, via a kiosk, via a box office, or other ticket channel. The purchaser provides, via the corresponding channel, the names and/or other identification associated with the individuals who are going to use the tickets. Optionally, the purchaser can specifically assign a given ticket (e.g., a ticket for a specified reserved seat) to a specific named/identified individual, or the purchaser can allow the ticket distribution system to automatically allocate purchased tickets to corresponding named individuals. Optionally, to better prevent scalpers or other ticket resellers from purchasing tickets for resale, the purchaser can be required to designate herself or himself as a user of one of the purchased tickets. Optionally, the purchaser is prohibited or otherwise prevented from transferring the ticket designated for the purchaser to another person, or is optionally prevented from transferring more than a certain number of tickets originally designated for the purchaser to another user in a specified period of time (e.g., more than three times a year, more than twice every sixth months, etc.).

By way of illustration, in order to enhance security, in addition to or instead of names, optionally the ticket purchaser may be asked to provide a unique or substantially unique identifier associated with the individuals that are going to use the tickets. For example, the unique identifier can be a driver license number (number, as used herein can include letters and other characters as well as numbers), a social security number, a credit card number, an identifier associated with an account the individual has with the ticket system, or other governmental or non-governmental identifier.

Optionally, in addition to, or instead of receiving certain types of identification information from the ticket purchaser, the ticket purchaser is requested to provide contact information (e.g., an email address, an SMS address, a phone address, and/or instant messaging address) for a given individual, and the ticket system will transmit, via the contact address, a request to the individual asking for identification information. For example, the request can include a request for the identifiers previously discussed, a biometric reading (e.g., picture of face and/or body, fingerprint, palm print, vein scan, retina scan, voice scan, etc.), a private key, an identifier from a smart card, or other identifier. Optionally, if certain types of identification information for the individual, the individual may not be requested to provided such information again. Optionally, the individual may be requested to go to a certain site (e.g., a ticket outlet or other location) to have certain biometric scans taken and/or copies of certain identification documents made (e.g., a copy of a driver license).

Optionally, the request can be in the form of an email with links to a Web form that provides field via which identification information can be entered. When the requested identification is received from the individual, it is stored in a database in association with data identifying the ticket (e.g., a substantially unique ticket code) assigned to the individual.

Optionally, if the individual is a registered user of the ticketing system, the ticket purchaser can provide an identifier that is stored in association with the individual's account (e.g., a unique user ID), instead of, or in addition to providing the identification information discussed above. Thus, the purchaser is optionally spared the trouble of providing further identification information.

A given ticket is associated with a designated named individual and has the individual's name and/or other identifier (e.g., a driver license number or other identifier) physically or electronically printed or formed thereon. For example, the name and/or other identifier can be provided in human readable, and/or machine readable form, such as in the form of a barcode, or stored in magnetic memory (e.g., a magstripe), in solid state memory (e.g., flash memory), or via a optical device (e.g., a hologram).

Optionally, one or more of the identifiers are provided on the ticket in encrypted and/or non-encrypted form. For example, the encryption can be performed using a private key as part of asymmetric key cryptography or using symmetric-key algorithms. Advantageously, the encrypted version of the identifier would be difficult for someone to forge in such a way that, when decrypted using a key provided by the ticketing system, it would correspond to the unencrypted identifier. Optionally, if an identifier for an individual is used for multiple tickets (e.g., for season tickets) the encrypted version of the identifier will be different for each ticket, making it more difficult to forge. Optionally, only an encrypted version of an identifier is provided on the ticket, enabling the identifier to be kept private (as may be desirable for a social security number or driver license number).

By way of example, the ticket can be an electronic ticket transmitted to the user over a network (e.g., via email to the ticket purchaser terminal, downloaded from a Web site to the ticket purchaser via a browser, transmitted to a wireless cell phone, etc.) with an embedded ticket holder identifier, ticket purchaser identifier and/or a unique ticket identifier. Optionally, the ticket can be a physically issued ticket (e.g., mailed to the ticket purchaser or provided to the ticket purchaser at a ticket outlet) with a printed ticket holder identifier, a ticket purchaser identifier, and/or a unique ticket identifier.

Optionally, where a ticket purchaser purchases a ticket to be used by another, the ticket can optionally be transmitted by the ticketing system directly to the designated recipient. For example, ticket can be sent to a physical or electronic address provided by the ticket purchaser during the purchase process, or using a physical or an electronic address previously stored in the ticket system database by the designated recipient (e.g., in an account established by the designated recipient) or by the ticket purchaser (e.g., in an online address book, or a data store of contact information of people that have previously received tickets from the ticket purchaser).

Optionally, the ticketing system can determine if an individual to whom a ticket is to be assigned is on a watch list (e.g., a ticket scalper, suspected criminal, system abuser, hooligan, security risk, and/or terrorist/no-fly watch lists). If the individual is on such a watch list, the ticketing system optionally automatically (or under manual control) transmits (e.g., over a network, in the form of an email, SMS message, instant message, or other message-type) a notification to another entity, such as a federal, state, or private security agency, and optionally, a ticket will not be assigned to the individual, or the ticket will be assigned and an alert will be provided to a security entity. The notification can include the individual's name and/or other identification/contact information, the ticket purchaser's name and/or other identification/contact information, information regarding when the attempted assignment took place, and information regarding the ticketed event, such as the name of the event, the date, the time, and the location.

Optionally, the ticket system automatically transmits over the network (e.g., in the form of a file or email) the names or other identifiers associated with the ticket purchaser and/or other individuals to whom tickets are to be assigned to a government or non-governmental entity, which can then determine whether the ticket purchaser or individuals or on a watch list (e.g., one or more of ticket scalper, suspected criminal, ticket system rule abuser, hooligan, security risk, and/or terrorist/no-fly watch lists). Optionally, the government or non-governmental entity can provide a notification to the ticket system as to whether the ticket purchaser or individuals or on a watch list, and/or whether or not a ticket should be issued to the ticket purchaser or individuals.

Optionally, the purchaser of the tickets and/or an individual associated with a purchased ticket can transfer (e.g., sell or transfer ownership as a present) a purchased ticket to another individual. For example, the transfer can be performed via a web site associated with the ticket distribution system. The web site operator could then, optionally, allow the transfer of such tickets to other individuals. Optionally, each time a ticket transfer or reassignment is made, a fee is charged. Optionally, only registered user's of the ticket system and/or user's that have an enhanced membership (e.g., by paying a yearly fee), are allowed to transfer tickets.

Optionally, to discourage scalpers from purchasing tickets, the purchaser is prevented from transferring the ticket assigned to the purchaser, but other assignees can be permitted to transfer or reassign tickets. Thus, if a scalper purchases multiple tickets with the intent of reselling the tickets, the purchaser will be prevented from reselling or otherwise transferring at least one ticket. Further, a ticket purchaser can be limited to purchasing no more than a specified quantity of tickets (e.g., 4 tickets). Thus, for example, if a scalper purchased the maximum number of tickets allowed, such as 4 tickets, and the purchaser is prevented from transferring at least one of those tickets, then 25% of the tickets purchased by the scalper will be wasted, thereby providing a disincentive to scalpers. Thus, if the purchaser attempts to transfer a ticket via the system (as similarly described below), the system detects such an attempt, informs the purchaser that such a transfer is not permitted, and will not process such a transfer.

As similarly discussed above, the user transferring the ticket is optionally asked to provide identification data and/or contact information for the new individual, using the same or a similar process as discussed above. Optionally, as similarly discussed above, the new individual is contacted and asked to provide identification information. The identification information is stored in a system database. A new physical or electronic ticket is issued bearing the name or other identifier associated with the new individual.

Optionally, to further discourage scalpers from purchasing tickets, the ability to transfer tickets can be limited to certain time periods. For example, optionally, a ticket purchaser's or ticket assignee's ability to reassign/transfer a ticket can be limited to one or more windows of time. By way of illustration, the reassignment/transfer of ticket can be limited to a certain period of time after the ticket was purchased (e.g., 5 days) and/or a certain period of time before the event date (e.g., 2 days).

When an individual bearing a ticket requests entry into an event venue (e.g., a stadium, a fair ground, a concert hall, a lecture hall, etc.), the individual is optionally asked to provide an additional form of identification, such as, by way of example, a driver license, a passport, a state identity card, a national identify card, a credit card, and/or a smart card. Optionally, the individual may also be requested or required to provide biometric information (e.g., picture, fingerprint, palm print, vein scan, retina scan, voice scan, etc.) via an appropriate biometric scanner. A gate keeper (e.g., a ticket collector or guard located at a venue entrance) checks the ticket and the additional form of identification to determine if there is a match (e.g., that the ticket user's name on ticket matches the name on the additional form of identification).

Optionally, if the ticket contains coded (e.g., encrypted) identification data, an electronic scanner system (e.g., a bar code scanner, a magnetic card reader, and/or a camera) reads the encoded/encrypted data from the ticket, decodes (e.g., decrypts either directly or via another system) the identification data, and displays the decoded/decrypted identification data to the gate keeper via a display. The gate keeper can then compare (e.g., manually) the displayed decrypted identification information with that provided by the ticket holder, and decide whether they match.

Optionally, in addition or instead, the electronic scanner system reads the unique ticket code from the ticket, accesses from a ticket system database identification information (e.g., a previously stored driver license number) for the user to whom the ticket is assigned, and displays on a terminal display the identification information to the gate keeper. The gate keeper can then compare the displayed identification information with that provided by the ticket holder, and decide whether they match.

Optionally, in addition or instead, the electronic scanner system reads the unique ticket code from the ticket, accesses from a ticket system database identification information for the user to whom the ticket is assigned, reads identification information from the identification document or other item provided by the ticket holder (e.g., a driver license), compares the identification information from the identification document or other item with that from the ticket, determines if there is a match, and provides a match/no match indication to the gate keeper and/or other terminals monitored by security personnel that can respond. Optionally, in addition or instead, a biometric input device takes a biometric reading of the ticket holder at the venue entrance, and the system compares the biometric reading with one stored in the system database (e.g., with an association to the ticket identifier) to determine if there is a match. A match/no match determination or indication is then transmitted for display to the gate keeper.

Optionally, in addition or instead of using the processes described above to prevent undesirables (e.g., suspected criminals, hooligans, security risks, and/or potential terrorists) from obtaining and/or using an event ticket, some or all of the processes can also be used to prevent the use of resold of tickets, which can hinder ticket scalpers from reselling tickets, and hence discourage ticket scalpers from purchasing tickets. For example, if a secondary market purchaser purchased a resold ticket that still has the original ticket holder's identification information printed thereon, in accordance with one or more of the processes described above, the secondary market purchaser would be denied admission to the event.

As similarly described above, ticket holders (the "Sender") can electronically transfer a ticket to another person (the "Recipient"). This can be done by the Sender providing to the system identifying information relating to the ticket and the Recipient's email address, user id, password, or other information identifying the Recipient. The Sender, or the system, then communicates to the Recipient that the Sender is trying to, or is forwarding a ticket, including associated admission rights or authorizations, to the Recipient. The communication can include a system-generated new ticket to the Recipient with a barcode identifier, information about where the Recipient may retrieve a new ticket, and/or information that can be used to gain access to the event, such as a code that can be used to gain admission. The system can then cancel the ticket held by the Sender either (a) when the Sender instructs the system to transfer the ticket or (b) when the Recipient retrieves the new ticket from either the communication or from another retrieval place where he retrieves it. Such other place may include a web site. The Recipient, in turn, can optionally be allowed to resell or forward the ticket, and so also be a Sender. However, the Recipient can instead be prohibited from reselling or forwarding the ticket to any other user, to selected users, to user's that fail to meet certain criteria (e.g., such as those that the Recipient had to meet). Advantageously, the system can keep a record of each transaction so that the system can track who the current ticket holder is, as well as who has previously held the ticket.

An example system allows a user who has previously obtained one or more tickets directly or indirectly from another seller to selectively post or offer those tickets for sale over an electronic system. Optionally, the system provides the seller over a computer network an electronic form displayed via a web page. For example, the form can be generated using HTML, Java, XML, and/or other rendering software. The form receives from the seller characters or other codes to identify the tickets to be sold. The tickets are posted on a Web site host by the system or optionally on another system. Potential buyers can then access the networked system via a client terminal to view information, such as price and/or seat location, related to tickets posted for sale by this or other sellers, and to selectively make ticket purchases via the system. A buyer is optionally required to provide one or more types of identification information or documents, as similarly described above, used to verify the buyer's identity. If a buyer purchases tickets, then the system cancels the seller's tickets and will issue new tickets (e.g., electronic or physical) to the buyer with the buyer name and/or other ticket user identification data provided thereon (e.g., a driver license number or other identifier, in encrypted and/or unencrypted form, in human readable and/or machine readable form). The system operator or affiliate can optionally guarantee the sale and/or purchase of a resold ticket.

Optionally, the system can restrict the types of tickets that will be posted. For example, the system can prevent the posting of tickets without barcodes, tickets that are not associated with a particular individual (e.g., that are not associated with a ticket holder identified by name or otherwise in a database in association with a ticket identifier), tickets for certain events for which information is not available in a system database, and/or the like. Optionally, before a sale is completed and/or before a ticket is issued to the buyer the buyer's identity is checked against watch databases (e.g., one or more databases that store identification information on ticket scalpers, suspected or actual criminals, ticket system rule abusers, hooligans, security risks, suspected terrorists, etc.), and, as similarly described above, if the buyer's name appears in such a database, the ticket is optionally not issued to the buyer, and one or more governmental and/or non-governmental entities are informed. Optionally, in addition and/or instead, the buyer's identification information and identity are verified via one or more databases. If the buyer is purchasing more than one resold ticket for an event, optionally, the buyer will be asked to provide a name and/or other identification data for each person that is going to use a ticket, as similarly described above.

As part of the purchase process, the system can accept payment from the buyer and then remit the payment, or a portion thereof, to the seller. The system can deduct a portion of the payment as compensation to the system operator, affiliate thereof, a venue, service provider, and/or performer/sports team. Alternatively or in addition, the seller can be charged a fee upon posting the ticket for sale. The buyer can be charged a processing fee and/or a percentage of the purchase price as well. For example a user can be charged 10% of the posting price for the ticket upon sale of the ticket. Optionally, payment for the purchase of the ticket to the seller is not remitted to the seller until the seller returns the seller's original ticket to the system or system operator.

The system can deliver, or trigger the delivery of the tickets to the buyer. In addition, the system or system operator can accept the cancelled tickets from the seller to take the tickets out of circulation, verify that the cancelled tickets are authentic, and/or verify that the seller's name and/or other identification information is on the canceled tickets. Optionally, if one or more of the verification processes fail, one or more governmental and/or non-governmental entities can be notified (e.g., law enforcement agencies) and tickets that had been issued to the buyer are optionally cancelled. The system can store in a user account database bank account, credit card, and other payment and financial information to pre-authorize buyers and sellers, and to facilitate payment.

The system can apply rules that require certain information to be solicited or displayed, or that prohibit, or restrict certain aspects of certain transactions, including, but not limited to, prices offered, prices paid, quantities of tickets offered, quantities of tickets purchased, generally or with respect to types, characteristics, timing or locations of the seller, forms of identification (e.g., at least two forms of identification; or at least a driver's license, a passport, a social security number, etc), buyer or Ticketed Item/Event or transactions related thereto. Such rules may be based on business or legal objectives, requirements, considerations or concerns, which may include, without limitation, global, federal, state, city, regional or local laws, fraud or system abuse parameters, potential terrorist parameters, transaction volume, or number of sales in a given period parameters.

For example, some states or localities have regulations, such as anti-scalping regulations, that control or regulate the sale, resale, and purchase of tickets. Optionally, each offer for resell of a ticket can be analyzed by a legal engine to determine whether the resell is in compliance with state or local regulations of the reseller, the buyer, venue, and/or where the system or system operator are located. For example, the seller or Sender can be asked to supply information regarding his or her residence, such as the city, state, and/or zip code of the residence. Similarly, the buyer or the Receiver can be asked to supply information regarding his or her residence, such as the city, state, and/or zip code of the residence.

When a seller attempts to post a ticket for sale, or when a buyer makes a purchase request, the system's legal engine can then access one or more database records corresponding to that state and/or locality of seller, buyer, and/or venue. The one or more database records can include an indication as to whether the resell of tickets is permitted by individuals and/or other entity-type in the state or locality, whether the particular seller is barred from making such sales, whether there is a limit on the amount over ticket face value that can be charged and/or whether there is a limit on the number of tickets an individual, or other specified entity, can sell within a specified period or for a given event.

If a particular sale is prohibited under the regulations of the residence of the seller and/or venue, then the system notifies the prospective seller that the posting of the ticket for sale will not be accepted. If the sale is prohibited because the seller was asking too high a price, the seller is notified by the system of the prohibition reason, and is informed of the maximum price or premium that the seller can charge for the ticket. Similarly, if the sale is prohibited because the seller was selling too great a quantity of tickets, the seller is notified by the system of the prohibition reason, and is informed of the maximum number of tickets the seller can sell or post at this time. If the sale of a ticket is prohibited based on the location of a prospective buyer, then in response to the prospective buyer making a purchase request, the buyer can be notified that the purchase request will not be accepted.

The system can deliver messages, via a web page, email, or a dialog interface, to users indicating when rules are violated. These rules can be selectively turned on and off, and can otherwise be modified, by the system's administrators.

The system optionally allows transactions to happen anonymously so that buyers and sellers are not required to meet or to work directly with each other, or be able to personally identify each other outside of the context of the transaction wherein the system provides certain information, in the form of a code or the like, identifying the buyer or seller. Optionally, the system can post selected information (e.g., a legal name, at least a last name, city/state of residence, etc.) about the buyer or seller if so required by state or local regulations. When such is the case, the buyer and/or seller will be notified that such posting will take place.

The system is optionally integrated into an overall ticket inventory management system, which can track each purchase and sale, as well as the identities of the seller and the buyer, prices paid, quantities ordered, and delivery information. Information regarding the foregoing can be stored in the system database and accessed as needed to perform the processing described herein. The inventory system also provides for customer service-based locking of seats, reissuing of tickets, and the transfer of seats between the secondary and primary markets.

The system can maintain a database record of the full history of the ticket, including the original ticket issuance and ticket transfers for a seat at a given event and optionally evaluate the history to determine if the ticket has been purchased at some point in time by a ticket scalper and/or to determine if there is a potential security risk (e.g., that a hooligan, pickpocket, terrorist, etc. has possibly acquired the ticket). The ticket history can enable the detection of the use of counterfeit tickets for the seat and can aid venue staff members to resolve conflicts with respect to two or more users both holding tickets for the same seat at the same event. For example, if the ticket history indicates that a presenting user was the last purchaser or recipient of the ticket (e.g., where the presenting user provided identification information verifying the presenting user's identity), then that presenting user can be granted use of the seat for the event, while other presenting users can be denied use of the seat for the event. Optionally, those other presenting users can be reported to and/or processed by security personnel.

The administrator or operator of a Ticketed Item/Event (which may include, but not be limited to, a person at a venue location, a point of redemption, or an origin point of travel) can be informed of a change in holder (e.g., including the name of the new holder) or other status of the ticket via a message transmitted by the system over a computer network to a computer system associated with the administrator or Ticketed Item/Event.

With respect to sales and purchases, the system enables money to be electronically deposited or credited into, or charged or withdrawn against, users' bank, credit or other payment or financial institution accounts, customer credit account for purchasing additional tickets, whether the user is a buyer or a seller, and whether the ticket, or transaction involving the ticket, is being purchased, refunded, reversed, returned, or the Ticketed Item/Event is being cancelled or postponed.

The system can divide up a payment made by a buyer or a seller and remit parts of it to different parties or different accounts, in situations which may include, but not be limited to, the sale, refund, reversal or return of a ticket or the postponement or cancellation of a Ticketed Item/Event.

Users can access the system to review past account activity and to modify or manage their accounts, change the names of individuals who currently are intended to use tickets purchased by the user, or their ticket sale postings, which they can modify or terminate. For example, users can access the system to review the status of their ticketing transactions, including checking on event cancellations and postponements, shipping information and receipt of sold ticket information, and the identities of individuals currently assigned to tickets purchased by the user. Users can also optionally add contacts to an online address book associated with their account. Users can also access the system to change asking prices for tickets, to remove tickets from sale, or to set sale deadlines.

Optionally, a user can be required to register with the system before being allowed to post a ticket for sale. As part of the registration process, the user may be requested to provide the user's name, mailing address, email address, reliable and/or verifiable identifier, season ticket holder account information, billing address, phone number, and/or a form of payment. If the form of payment is a credit card, the user can be further asked to provide the card expiration address. In addition, the user may be requested to provide checking or bank account information corresponding to the account in which payment is to be deposited for the sale of tickets by the user. The account information can also be used for identity verification. The credit card or checking account information can also be used to collect payment from the user if the user sold tickets for an event, and the event is then cancelled. The payment can then be remitted to the purchaser of the ticket from the seller. The user may be asked if the user is a licensed broker, and it so, can be asked to supply the company name and license number.

In order to ensure that valid tickets are being sold or resold, the system verifies whether a ticket that a user is trying to sell has in fact been previously issued or is still valid, and verifies the accuracy of a unique code or number assigned to each ticket. For example, the code can be a unique 12 or 16 digit barcode number. The verification can be performed by comparing the code of the ticket being sold to codes stored in the system's database or a database connected with the system. This unique code can be used by the seller to post the ticket for sale, as described below. The user's identity can likewise be verified (e.g., by comparing identification data/documents provided by the user with that printed on the ticket and/or recorded in the system database in association with the ticket code).

The system can be accessed by a person so that that person can verify via data retrieved from the system database, whether a ticket, or physical, electronic or other manifestation of a ticket, is still valid for a corresponding ticketed item or event, or whether that ticket (or physical, electronic or other manifestation thereof) has been cancelled or is otherwise no longer valid.

By way of example, the cancellation of the Sender's ticket can be performed by storing a cancellation or invalidation indication in system database in association with the unique code associated with the original ticket, or by removing a reference to the Sender's ticket in the system database. Then, if the Sender or someone else attempts to use the Sender's ticket, the ticket can be scanned via a scanner at the point of attempted use, and the scanned code can be transmitted over a network to the system via a local terminal coupled to the scanner. For example, the code can be printed on a physical ticket as a barcode, and scanned via an optical barcode scanner. Similarly, the code can be stored on a magnetic strip or band on the ticket and scanned using a magnetic strip scanner. The code can then be compared by the system with information stored in the system database, the ticket can be identified or characterized as invalid and/or cancelled, and the characterization can be transmitted to the terminal, at which time the terminal operator can read the characterization and deny the holder of the Sender's ticket the corresponding ticket service, such as admission to a particular event for which the ticket was issued.

Should an event or service corresponding to a ticket be cancelled or postponed, optionally both the seller and buyer is notified via mail, email, phone, and/or the like. If the buyer purchased one or more event tickets for others, and provided the names (and/or other identifiers) and contact information (e.g., email address, physical address, instant message addresses, phone number, SMS address) of those persons to who the tickets are to be correspondingly associated, a cancellation notification can be provided to those persons as well (e.g., via an email, a letter, an instant message, a voice message, and/or an SMS message). If there was more than one seller who held the ticket at some point, optionally each seller is provided with a notification.

In the case of a cancellation, a refund of the ticket price will optionally be provided to the buyer. Associated processing charges, commissions, convenience charges, and/or shipping charges, can optionally be refunded as well, or they may be retained by the system operator, ticket issuer, or related entities. Proceeds paid by the recipient to the seller for the ticket may be collected from the seller in order to pay for the refund to the buyer. The original ticket price paid by the original seller can optionally be collected from the original issuer of the ticket, such as a sport team, a concert promoter, a venue, or the like, and this amount can be paid to the original seller. Alternatively, if the original seller had paid for the ticket via credit card, the charge can be cancelled.

If an event is cancelled before the seller has resold the ticket, the system can remove the post to prevent another user from attempting to purchase the ticket.

Optionally, if the event is rescheduled, rather than providing a refund, the system can determine who is the last Recipient and issue a new ticket to the last Recipient for the new date and/or venue, while canceling the old ticket. If the Recipient purchased one or more tickets for others and provided, directly or indirectly, corresponding contact information, optionally, then system sends new tickets directly to them (e.g., via email).

In addition, the system optionally performs fraud detection and avoidance to further enhance transaction and event security. Optionally, before posting a ticket, the seller can be required to submit a ticket identifier or code and/or a ticket holder identifier which can be printed or stored on the ticket. If the code fails to match with a ticket identifier stored in the system database, or appears to be an improper code, the posting can be refused as the ticket failed to be verified as authentic. In order to ensure that the seller was indeed a valid ticket holder, to receive payment the seller can be required to mail or return the original ticket purchased by the seller, as well as an optional signed and completed remittance form acknowledging the sale of the ticket. If the seller had originally received the ticket electronically, the user may optionally be required to provide a printout of the electronic ticket, or a copy thereof. If it is determined that a seller is attempting fraud, the seller can be prevented from posting and/or buying tickets in the future, and the seller can be reported to a government agency (e.g., a law enforcement agency).

The buyer can also be subject to fraud detection. For example, if the buyer is using a credit card to make a purchase, the credit card can be verified before completing the sale, and the system can then reissue the ticket to the seller if the seller's ticket had been cancelled. If it is determined that a buyer is attempting fraud, the buyer can be prevented from posting and/or buying tickets in the future, and the buyer can be reported to a government agency (e.g., a law enforcement agency).

Optionally, other ticket brokers, as well as other specified entities, can be selectively prohibited or prevented from using some or all of the site functionality. For example, other ticket brokers can be prevented from buying and/or posting tickets using the system.

Example ticketing apparatus, processes, and user interfaces will now be described with reference to the figures. Throughout the following description, reference will be made to various implementation-specific details, including, for example, process flows, protocol standards, and forms used for requesting and offering tickets. These details are provided in order to set forth preferred embodiments of the invention, and not to limit the scope of the invention.

FIG. 1A illustrates example hardware components and software components that can be invoked during the processes described herein. An example ticketing system operated by a ticket processing service or other entity can include ticketing servers 102A, account manager servers 108A, a credit card authorization system 106A, a network, 104A, and a router 116A. The ticketing system can host a Web site accessible by users for purchasing, selling, and transferring tickets. The Web site may optionally include content that spans multiple Internet domains, and/or may be implemented using physical servers that are geographically remote from one another. A legal engine optionally resides on one or more of the foregoing systems to ensure that ticket postings and sales comply with applicable governmental or other regulations (e.g., security related regulations, anti-scalping laws, etc.).

As depicted, users access the ticket processor ticketing system over the Internet 110A using respective terminals 112A, 114A, which can be personal computers. In addition or alternatively, users can access the ticketing system via other general-purpose computers that have access to the Internet, via networked personal digital assistants, phones, interactive televisions, or other user terminal types. The user terminals 112A, 114A may run commercially-available Web browser applications, such as those which implement the basic World Wide Web standards such as HTTP and HTML, or other types of applications that access data from networked sites.

The user terminals 112A, 114A may also run email applications, such as Microsoft Outlook®, which may be used to receive communications from the ticketing system. The e-mail application and the browser may be integrated with one another, and/or may be integrated with other application programs or the operating system. The terminals 112A, 114A can include displays, keyboards, memory storage devices, printers, network interfaces, and the like. The user terminals 112A, 114A can also be configured to receive SMS and/or instant messaging communications.

The ticket processing ticketing system can include one or more databases, such as a user account database, that stores some or all of the following: user contact information, billing information, identification information/codes (e.g., driver license number, passport number, date of birth, city of birth, mother's maiden name, pet name, etc.), copies of identification documents (e.g., electronic copies of a driver license, state identification card, etc), preferences, account status, a database of user contacts (e.g., including the names and contact information for fiends, family, and/or business associates), biometric data (e.g., a fingerprint, a voice scan, a vein scan, a palm scan, image data, etc.) and the like, that can be accessed by other portions of the ticketing system, such as by account manager servers 108A. Similarly, one or more ticket databases accessible by the ticketing system can include ticket information records for tickets, including barcode information, event name, event date, seat identifier, ticket holder name or other identifier of a current ticket holder, names or other identifiers of past holders of the ticket, ticket purchaser name or other identifier of most recent ticket purchaser, names or other identifiers of past purchasers of the ticket, a ticket valid/invalid indicator, and an indicator that as to whether the ticket has been used.

The ticketing system can optionally be coupled to one or more watch list databases 126A (e.g., operated by the ticketing system operator, one or more other private entities, a governmental entity, etc.) which can be accessed to determine if a user attempting to purchase a ticket and/or a person to whom a ticket is being assigned is on a watch list (e.g., e.g., one or more of ticket scalper, suspected criminal, ticket system rule abuser, hooligan, security risk, and/or terrorist/no-fly watch lists), and if such a person should be provided with special treatment (e.g., denial of ticket, notification of a security agency, etc.).

As further depicted by FIG. 1A, a ticket issuer, which can be a sports team, venue operator, ticketing agency, or the like, accesses the ticketing system via the router 116A. The ticket issuer can have a ticket issuer ticket system 120A that hosts an application, such as Ticketmaster's commercially available Archtics™ application, that is used to define events, set ticket prices, and provide real-time integration with the ticket processor ticketing system. In addition, via the system 120A, the ticket issuer can optionally define customized invoices, tickets, receipts, labels, and other correspondence. The system 120A optionally allows the ticket issuer to define at least portions of the Web pages that will be displayed to users, such as by defining logos, fonts, colors, and the like.

The system 120A is connected to an intranet and/or the Internet 118A to thereby access the router 116A, access management system 122A, and to receive data from a scanner 124A (e.g., a barcode scanner, a character reader, etc.) that optionally scans tickets for ticket codes, ticket holder codes, and/or ticket purchaser codes. The scanner 124A optionally is configured to scan one or more types of identification devices (e.g., driver license magstripes, passport RFID tags, etc.) The scanner 124A optionally includes a biometric scanner configured to scan one or more physical attributes of a ticket holder (e.g., fingerprint, palm, veins, retina, voice, face, body, etc.).

The access management system 122A, an example of which is the server-based Access Manager™ system that is commercially available from Ticketmaster, is used to authenticate tickets proffered at an event venue, and to determine if the current ticket holder is an authorized ticket holder optionally using processes described elsewhere herein. For example, the authentication can be based in part on data received from the scanner 124A and/or from one or more databases. The access management system servers can optionally use a database and/or an encryption/decryption algorithm for ticket holder and/or ticket identification lookup.

If a ticket fails to authenticate and/or the ticket holder is not authorized, optionally a notification or alert to that effect is provided to a gate keeper and transmitted to one or more security terminals 128A.

The access management system 122A can optionally generate reports tracking attendance, entry traffic by time, intervals, rejected admission attempts, and admissions by entry point, ticket type and/or price code when applicable.

By way of example, the ticket issuer ticketing system 120A generates ticket barcodes and/or human readable data. Optionally, each event/seat/print-count combination is associated with a unique barcode. A print count is the number of times tickets for an individual seat location that has been issued. Optionally, a ticket is also associated with a ticket holder whose name and/or other identification information is provided on the ticket in barcode, magnetic, solid state memory, and/or human readable format.

The ticket issuer sells tickets, such as concert tickets, single event tickets, or season tickets, to a first user, either directly or via the ticketing service ticket processing system. For example, the first user can initiate and complete the purchase via the user terminal 114A and can further authorize payment via a credit card, debit charge, or otherwise. The first user can then use the terminal 114A to post, via the account manager 108A, one or more of the tickets for sale on the Web site hosted by the ticketing system or to assign the tickets to another (e.g., as a gift). A record of the posting can be stored in the ticket database, which can be stored on the ticketing system 120A, the account manager servers 108A, and/or the ticketing servers 102A.

A second user can initiate, authorize payment, and complete a purchase of one or more of the posted tickets via the user terminal 112A. If the second user is paying by credit card, the credit card authorization system 106A checks to make sure the credit card is authorized and has not exceeded its credit limit. The system can also receive and verify other identification data provided by the second user for the second user and/or for others to whom the second user is allocating tickets. The ticketing system 120A invalidates the first user's ticket(s) for which access rights have been purchased by the second user. An invalidation indicator is stored in association with the barcode information in the ticketing system database, as well as in a database associated with the access management system 122A. Thus, if someone tries to use the original, first user's ticket to access the corresponding event or game, the original ticket's barcode will be scanned using the barcode scanner 124A. The access management system 122A will compare the scanned barcode information with that stored in the access management system database, and via the invalidation indication determine that the ticket has been invalidated or cancelled. The holder of the original ticket can then be denied entry to the event.

Optionally, two or more of the ticketing servers 102A, account manager servers 108A, credit card authorization system 106A, ticketing system 120A, and access management system 122A can be co-located and/or hosted by the same computer system.

An example ticket delivery option that can be used by the system is electronic delivery. By way of example, electronic delivery can send or deliver a ticket, or a manifestation of a ticket (which, will also be referred to as a "ticket"), (a) inside an email, (b) as an attachment to an email, (c) as a download from a web site, (d) as an SMS message to a cellular phone, or (e) otherwise. The user can then print the electronic ticket (including a user identifier) for use at a venue, or the corresponding information can be transmitted to the venue's ticketing apparatus so that an operator can retrieve the ticket information. The system can track when the delivery is sent, received or accepted and store such information in the system database. Optionally or in addition, the ticket can be mailed as a physical ticket via the postal service, courier service, or otherwise. If a buyer is purchasing from a previous purchaser multiple tickets for an event for the buyer and for others (e.g., as a gift, or purchasing on their behalf), then, optionally, all the purchased tickets are electronically or physically provided to the buyer with the corresponding user (e.g., ticket holder and/or ticket buyer) identification data printed thereon.

Figure 1B:
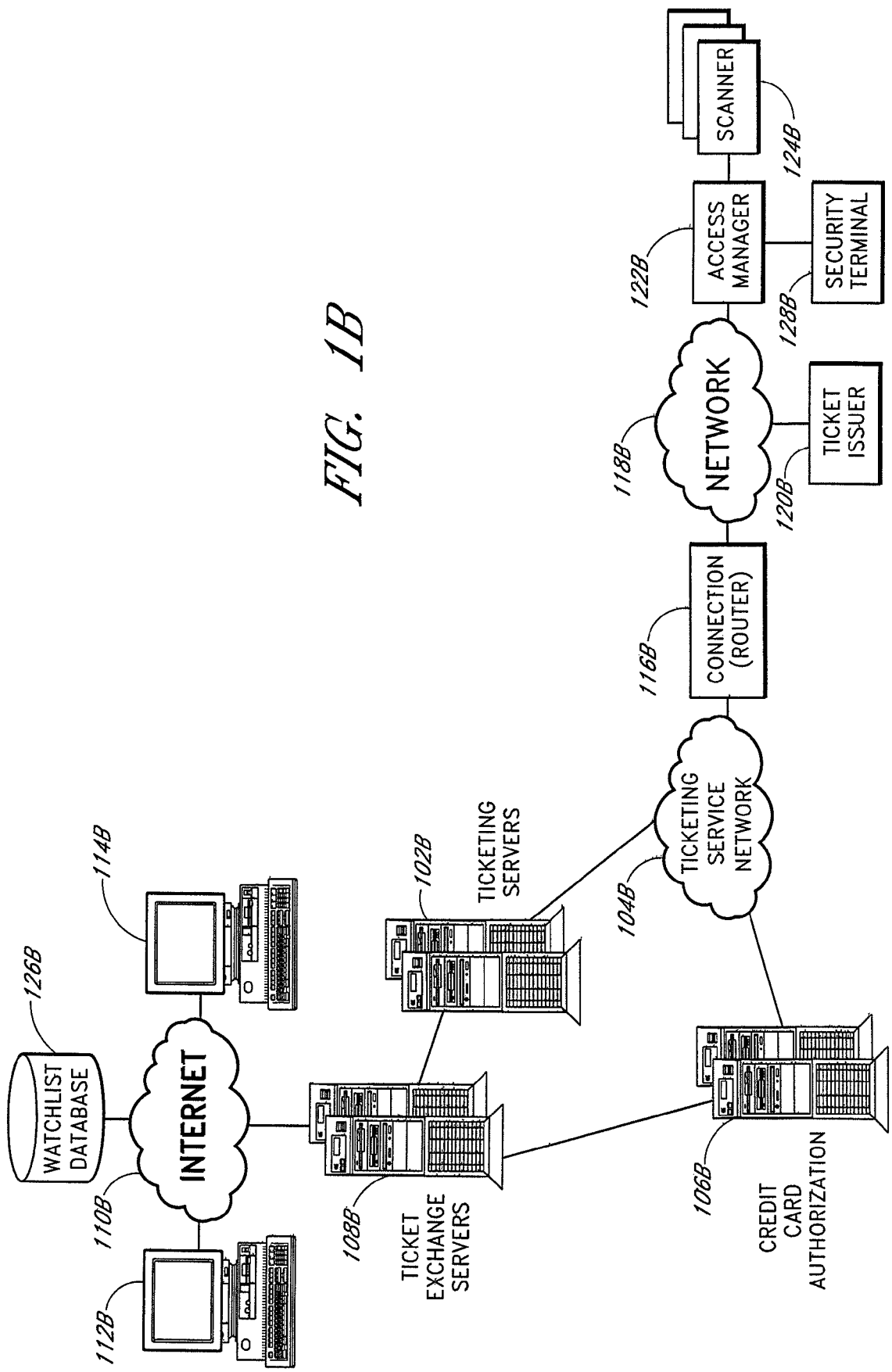

FIG. 1B illustrates another embodiment of example hardware components and software components that can be invoked during the processes described herein. An example ticketing system operated by a ticket processing service or other entity can include ticketing servers 102B, ticket exchange servers 108B, a credit card authorization system 106B, a network, 104B, and a router 116B. As depicted, in this embodiment the ticket exchange servers are connected directly to the ticketing servers 102B and the credit card authorization servers 106B. The illustrated system otherwise operates as similarly described above with respect to FIG. 1A.

A legal engine optionally resides on one or more of the foregoing systems to ensure that ticket postings and sales comply with applicable governmental or other regulations. As similarly discussed above with respect to FIG. 1A, the ticketing system illustrated in FIG. 1B can host a Web site accessible by users for purchasing, selling, and transferring tickets. The Web site may optionally include content that spans multiple Internet domains, and/or may be implemented using physical servers that are geographically remote from one another.

As depicted, users access the ticket processor ticketing system over the Internet 110B using respective PCs 112B, 114B. In addition or alternatively, users can access the ticketing system via other general-purpose computers that have access to the Internet, via networked personal digital assistants, phones, interactive televisions, or other user terminal types. The user terminals 112B, 114B may run commercially-available Web browser applications, such as those which implement the basic World Wide Web standards such as HTTP and HTML, or other types of applications that access data from networked sites.

The user terminals 112B, 114B may also run an email client (e.g., a commercially available e-mail application, such as Microsoft Outlook®), which may be used to receive communications from the ticketing system. The e-mail application and the browser may be integrated with one another, and/or may be integrated with other application programs or the operating system. The user terminals 112B, 114B can also be configured to receive SMS and/or instant messaging communications. The terminals 112B, 114B can include displays, keyboards, memory storage devices, printers, and the like.

Similarly, one or more ticket databases accessible by the ticketing system can include ticket information records for tickets, including barcode information, event name, event date, seat identifier, ticket holder name or other identifier of a current ticket holder, names or other identifiers of past holders of the ticket, ticket purchaser name or other identifier of most recent ticket purchaser, names or other identifiers of past purchasers of the ticket, a ticket valid/invalid indicator, and an indicator that as to whether the ticket has been used. The ticketing system can optionally be coupled to one or more watch list databases 126B (e.g., operated by the ticketing system operator, one or more other private entities, a governmental entity, etc.) which can be accessed to determine if a user attempting to purchase a ticket and/or a person to whom a ticket is being assigned is on the watch list (e.g., e.g., one or more of ticket scalper, suspected criminal, ticket system rule abuser, hooligan, security risk, and/or terrorist/no-fly watch lists), and if such a person should be provided with special treatment (e.g., denial of ticket, notification of a security agency, etc.).

As further depicted by FIG. 1B, a ticket issuer, which can be a venue operator, an artist, a promoter, a ticketing agency, a user reselling tickets, or the like, accesses the ticketing system via the router 116B.

The system 120B is connected to an intranet and/or the Internet 118B to thereby access the router 116B, access management system 122B, and to receive data from a scanner 124B. The access management system 122B, an example of which is the server-based Access Manager™ system that is commercially available from Ticketmaster, is used to authenticate tickets proffered at an event venue and can optionally determine if a ticket holder is an authorized ticket holder. If a ticket fails to authenticate and/or the ticket holder is not authorized, optionally a notification or alert to that effect is provided to a gate keeper and transmitted to one or more security terminals 128B. The scanner 124B optionally includes a barcode scanner, a character reader, and/or a camera, which scans tickets for ticket codes, ticket holder codes, and/or ticket purchaser codes. The scanner 124B optionally is configured to scan one or more types of identification devices (e.g., driver license magstripes, passport RFID tags, etc.). The scanner 124B optionally includes a biometric scanner configured to scan one or more physical attributes of a ticket holder (e.g., fingerprint, palm, veins, retina, voice, face, body, etc.).

The access management system 122B can optionally generate reports tracking attendance, entry traffic by time, intervals, rejected admission attempts, and admissions by entry point, ticket type and/or price code when applicable.

The access management system 122B utilizes the barcode information scanned from a ticket using the scanner 124B to perform the authentication. The access management system servers can optionally use a database and/or an encryption/decryption algorithm for ticket identification lookup.

By way of example, in the case of a user reselling tickets, the ticket issuer ticketing system 120B can be a user computer executing a browser and used to post tickets. If the ticket issuer is the original ticket issuer, such as a venue operator, artist, or promoter, the system 120B can be used to generate ticket barcodes. If the system 120B is associated with the original ticket issuer, optionally, each event/seat/print-count combination is associated with a unique barcode. A print count is the number of times tickets for an individual seat location that has been issued.

The ticket issuer then sells tickets via the ticketing service ticket processing system to a first user. For example, the first user can initiate and complete the purchase via the user terminal 114B and can further authorize payment via a credit card, debit charge, or otherwise. The first user can then use the terminal 114B to post, via the ticket exchange 108B, one or more of the season tickets for sale on the Web site hosted by the ticketing system. A record of the posting can be stored in the ticket database, which can be stored on the ticketing system 120B, the ticket exchange servers 108B, and/or the ticketing servers 102B.

A second user can initiate, authorize payment, and complete a purchase of one or more of the posted tickets via the user terminal 112B. If the second user is paying by credit card, the credit card authorization system 106B checks to make sure the credit card is authorized and has not exceeded its credit limit. The ticket exchange servers 108B invalidate the first user's ticket for which access rights have been purchased by the second user. An invalidation indicator is stored in association with the barcode information in the ticketing system database, and optionally in a database associated with the access management system 122B. Thus, if someone tries to use the original, first user's ticket to access the corresponding event or game, the original ticket's barcode will be scanned using the barcode scanner 124B. The access management system 122B will compare the scanned barcode information with that stored in the access management system database, and via the invalidation indication determine that the ticket has been invalidated or cancelled. The holder of the original ticket can then be denied entry to the event.

Optionally, two or more of the ticketing servers 102B, ticket exchange servers 108B, credit card authorization system 106B, ticketing system 120B, and access management system 122B can be co-located and/or hosted by the same computer system.

Figure 2:
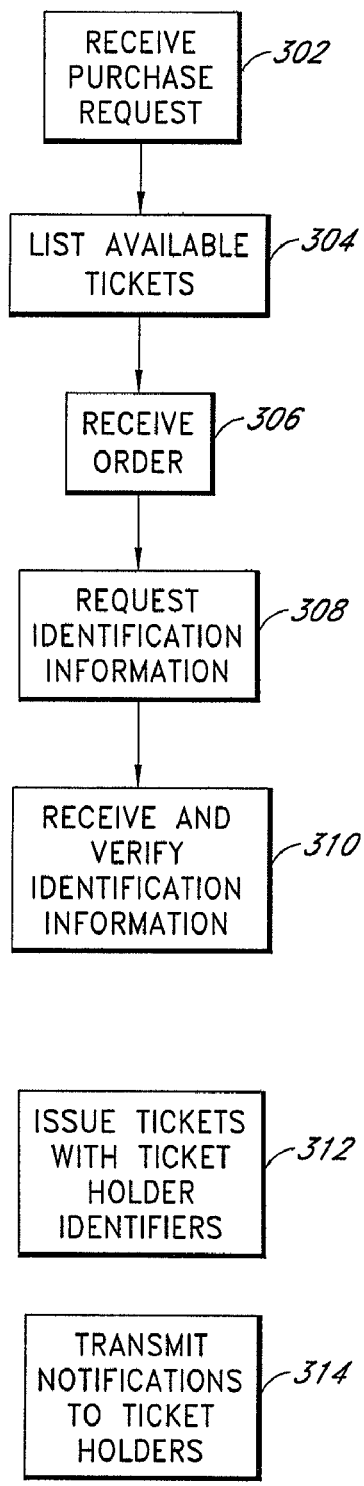
FIG. 2 illustrates a first example process.
Figure 3:
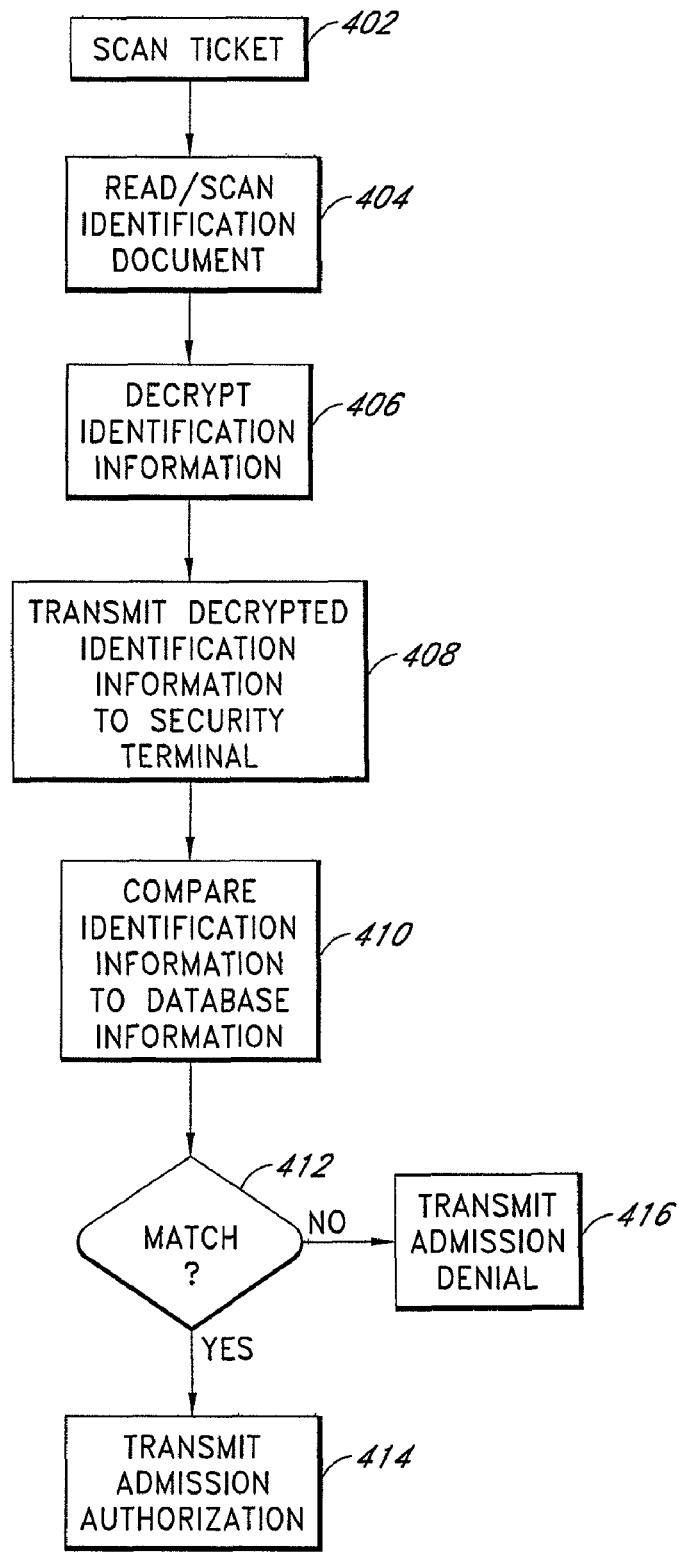
FIG. 3 illustrates a second example process.

FIG. 2 illustrates an example process for processing a ticket purchase request, including receiving ticket holder identification data and issuing tickets. At state 302, a ticket request for an event is received from a user (e.g., from a user terminal or ticket kiosk) at a ticketing system. The ticket request can be for seats at a selected price level or for the best available seats. At state 304, the ticketing system locates available tickets meeting the user's request and transmits information regarding the tickets (e.g., the price, section, row, and seat) for display to the user (e.g., to the user's terminal or a ticket kiosk being used by the user). The user can elect to proceed with the purchase of the offered tickets, abandon the ticket request, or request a new selection of tickets.

In this example, at state 306, the user accepts the offered tickets, and proceeds with the order. The ticketing system receives the order and requests that the user provide payment information (e.g., a credit card number), or payment information is accessed from the user's account information. The user may be asked to log-in (e.g., by providing a password and/or user ID) or establish an account (e.g., provide name and contact information, select a user ID and/or password).

At state 308, the user is asked to provide identification information, such as a name and/or other identification information, for the intended user/recipient of each purchased ticket. For example, if supplementary identification information is desired (e.g., information beyond the recipient name), the ticketing system optionally transmits a form including list of one or more acceptable forms of supplementary identification (e.g., a driver license, an account identifier, a credit card number, etc.) to the user (e.g., to the user's terminal or a ticket kiosk). The form can include fields to receive the identification information.

At state 310, the system receives the identification information. The system optionally verifies identification information, such as the supplementary identification information. For example, if the supplementary identification information includes a driver license number for a given prospective ticket holder, the number can be examined to determine if it is a valid number (e.g., has the correct number of alphanumeric characters, alphanumeric characters within an allowable range, letters in certain specified positions, and numbers in other specified positions, etc.), and a database (e.g., operated by or on behalf of a state) of valid driver license numbers can be checked to see if the provided number matches a valid number in the database, and whether the name associated with the license number in the database matches that provided by the purchasing user. In other embodiments, such supplementary identification information need not be provided. Optionally, the identification information can be checked against one or more watch lists (e.g., one or more of ticket scalper, suspected criminal, ticket system rule abuser, hooligan, security risk, and/or terrorist/no-fly watch lists). If the user appears on such a watch list, one or more rules can be read from system memory relating to such watch lists, and the ticket request can be handled in accordance with such rules.

If the identification information is received and verified, then at state 312, tickets are issued with the appropriate ticket holder identifiers printed or otherwise provided thereon. As similarly described above, the tickets can be issued to the purchasing user or sent directly to the designated ticket recipients. As similarly described above, the ticket can be emailed to a terminal, downloaded from a Web site to a terminal, transmitted to a wireless cell phone, or mailed to the ticket purchaser or intended recipient.

If there are future notifications regarding the event (e.g., an event cancellation, a ticket cancellation, a change of date, a change of venue, etc.) can be provided (e.g., via email, an SMS message, an instant message, regular mail, etc.) to the ticket purchaser and/or the ticket recipients.

Figure 4:
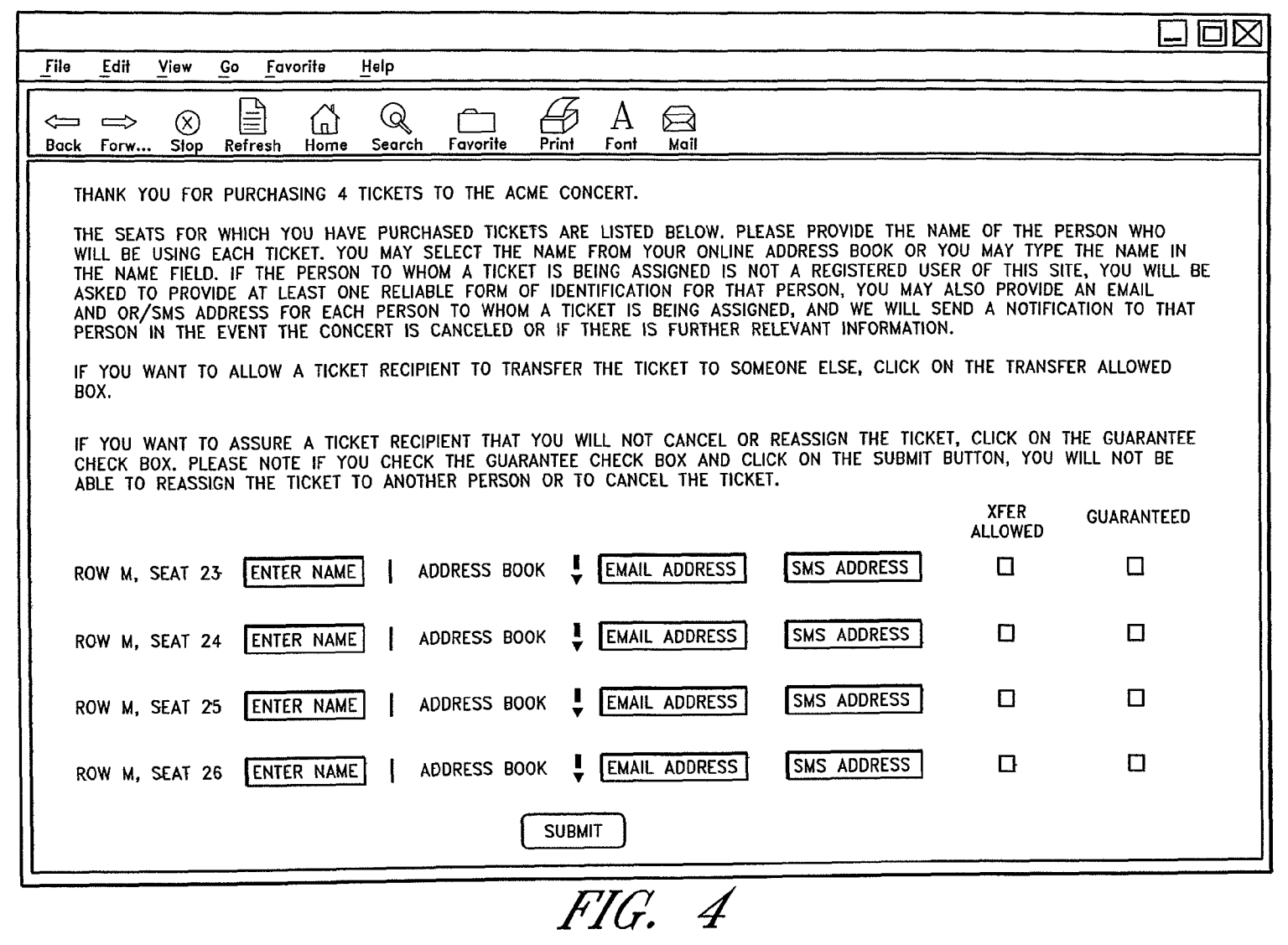

FIG. 4 illustrates an example process executed upon presentation of an event ticket at the event venue. At state 402 a ticket holder presents a ticket to a gate keeper (e.g., a human ticket taker, an electronic turnstile, etc.). Data stored on the ticket is scanned by a scanner. For example, the ticket can have a ticket identifier and a ticket holder identifier printed thereon in human readable and/or machine readable format, in encrypted or in unencrypted form. Optionally, the scanned data is transmitted to one or more other systems, as similarly described above with respect to FIGS. 1A-1B.

At state 404, an identification document provided by the ticket holder is scanned. For example, the identification document can be a driver license, a credit card, a passport, a state identification card, or other document. The identification document can have a magnetic stripe, an RFID tag, a hologram, or other data storage device that stores the name and/or other identification data of the document holder. At state 406, if the identification information accessed from the ticket is encrypted, the information is decrypted.

At state 408, some or all of the decrypted identification information is transmitted to one or more terminals, such as a terminal manned by the gate keeper or a terminal operated by security personnel. The gate keeper can manually compare the decrypted identification information with the information on the identification document to determine if they match. At state 410, the system can compare the identification from the ticket and/or the identification document with that accessed from a system database (e.g., using the ticket identification code as a search key to locate the appropriate record).

At state 412, a determination is made as to whether the ticket holder identification information from the ticket, the identification information from the identification document, and the ticket holder identifier from the database match. If there is a match, the process proceeds to state 414, and an admission authorization message is transmitted to the gate keeper terminal and the ticket holder is admitted to the event. Optionally, a turnstile or other access control barrier is opened/enable to turn automatically or in response to a gate keeper command. Optionally, the turnstile/access control barrier is coupled to the system which provides the command to allow the ticket holder to enter. If there is not a match, the process proceeds to state 416, and an admission denial message is transmitted to the gate keeper terminal and the ticket holder is refused admittance to the event.

FIG. 4 illustrates an example user interface configured to receive from a ticket purchaser allocations of tickets to ticket recipients, and corresponding identification information. The received information can be stored in a database. The form lists the seat information (e.g., row, seat number, section, etc.) corresponding to the purchased tickets. A field is optionally provided via which the ticket purchaser can manually enter the name of the intended ticket recipient. An address book field is optionally provided with a drop down menu that, when activated, causes names in an address book associated with the purchaser to be presented. In this example, the user can optionally select a ticket recipient from the presented names. An email field and an SMS field are provided via which the purchaser can enter corresponding email and SMS addresses for the recipient. Optionally, additional or different contact fields can be provided (e.g., an instant messaging address, a physical address, a phone number, etc.).

A "transfer allowed" checkbox field is optionally provided. If the transfer allowed checkbox is checked, the right to transfer the ticket will be provided to the recipient. For example, the recipient will be allowed to gift or sell the ticket to another. If the transfer allowed checkbox is not checked, then the recipient will not be entitled to transfer the ticket to another. Optionally, one or more rules may be stored in the system that prevents or prohibits ticket recipients from transferring the tickets for the event to another person. The rules may be specified by the system operator, the venue operator, a performer, a government entity, and/or other entity. For example, a rule may be a system-wide rule (e.g., no ticket purchaser can transfer a ticket assigned to the ticket purchaser), a rule that applies to one or more specified events (e.g., concerts by a specified performer), a rule that applies to one or more specified ticket purchasers, or a rule that applies to one or more specified recipients. If a rule prevents such as further transfer, optionally the transfer allowed checkbox is not presented or is disabled (e.g., grayed out).

A "guaranteed" checkbox is optionally provided. If the guaranteed checkbox is checked, the recipient will be guaranteed that the ticket purchaser cannot cancel the ticket or transfer the ticket to another. This advantageously enables the recipient to make plans (e.g., hire a babysitter, make dinner reservations) related to the event without having to worry about the ticket purchaser cancelling the ticket. Once the ticket purchaser completes the form, the ticket purchaser can activate a submit button and the data will be stored in the ticketing system. The recipients will optionally be informed that a ticket has been assigned to them, with an indication as to whether the ticket is transferable by the recipient, and whether the ticket purchaser can cancel or transfer the ticket to another.

Several example user interfaces will now be described. Optionally, the user interfaces may be accessed by a user terminal via a Web site hosted by a ticketing system, such as that described above.

FIG. 5 illustrates an example user interface form via which the ticket purchaser can enter identification data for a ticket recipient. A list of acceptable forms of identification information is provided with corresponding fields. In this example, the ticket purchaser can provide a driver license number, a state identification card number, a passport number, or two credit card numbers with Card Security Codes (CSC). Additional or different forms of identification can optionally be requested. The ticket purchaser can enter the data and activate a submit control, and the data is transmitted to, and stored by the ticketing system. Optionally, the ticket purchaser is not required to provide such identification data.

As similarly discussed above, optionally a form is transmitted to a ticket recipient via which the ticket recipient can provide supplementary identification information (information in addition to the recipient's name). FIG. 6 illustrates an example of such a form. In this example, the recipient is informed that a ticket has been assigned to the recipient, but that the ticket will not be issued until the recipient provides certain identification information. A list of acceptable forms of identification information is provided with corresponding fields. The recipient can enter the data and activate a submit control, and the data is transmitted to, and stored by the ticketing system.

FIG. 7 illustrates an example ticket. In this example, the ticket includes a printed ticket recipient name ("Jane Doe"), the recipient's driver license number ("B1234551"), and a corresponding bar code. The concert name ("Acme") and seat identifier ("Row M, Seat 34") are printed in human readable form and in the form of a barcode. Other text and information can optionally be provided on the ticket. For example, logos and names associated with the ticket issuer, venue, or an advertiser can be presented thereon. By way of further example, legal information, such as conditions of sale can be presented thereon.

While certain of the above example embodiments describe purchasing tickets at a set price, the processes and apparatus described above can be used when auctioning tickets. For example, in order for a bid for one or more tickets to be accepted, a bidder may be requested or required to provide identification data for the intended recipient of each ticket as similarly described above. Optionally, the identification data does not have to be provided until after a bidder's bid is a winning bid.

It should be understood that certain variations and modifications of this invention would suggest themselves to one of ordinary skill in the art. The scope of the present invention is not to be limited by the illustrations or the foregoing descriptions thereof.

What is claimed is:

1. An access control system, comprising:
   at least one system configured to:
   receive over a network a request from a user for a plurality of access permits for an event, wherein the plurality of access permits are associated with respective different seats;
   receive from the user user-specified allocations of the plurality of access permits to respective intended recipients including an allocation of an access permit to the user;
   enable the user to transfer one or more access permits in the plurality of access permits, and inhibit transfer by the user of the access permit allocated to the user;
   a scanner located adjacent to a venue entrance; and
   a computer system coupled to the scanner, the computer system configured to:
   receive coded user identification data scanned from an event admission token for a ticketed event from a token bearer via the scanner, wherein the admission token includes information identifying the ticketed event, and wherein the coded user identification data includes a reference to a record stored in a database that stores an identification code from the token bearer's driver license, credit card, passport, or state identification card;
   decode the coded user identification data,
   use the user identification data to access from the database the identification code from the token bearer's driver license, credit card, passport, or state identification card;
   receive coded information, scanned from the admission token for the ticketed event, including a unique event ticket identifier;
   transmit the identification code of the token bearer's driver license, credit card, passport, or state identification card and an indication as to whether the admission token is valid for the ticketed event to a terminal for display to a gate keeper so that the gate keeper can determine whether the token bearer is to be admitted.

2. The access control system as defined in claim 1, wherein the access control system is configured to determine whether the token bearer is to be admitted, without requiring biometric information to be electronically scanned from the token bearer.

3. The access control system as defined in claim 1, further comprising an access control barrier coupled to the computer system.

4. The access control system as defined in claim 1, further comprising:
   a ticketing server;
   an account manager;
   a credit card authorization system; and
   and a router.

5. The access control system as defined in claim 1, wherein the coded user identification data includes an encrypted unique identifier.

6. The access control system as defined in claim 5, wherein the access control system is configured to perform a decryption process on the encrypted user identification data.

7. The access control system as defined in claim 1, wherein the computer system is configured to decode the coded user identification data by using the coded user identification data to locate a corresponding user identifier from a database.

8. The access control system as defined in claim 1, wherein the computer system is configured to:
   receive user identification data scanned from an identification document separate from the access token;
   compare the scanned identification document user identification data with the coded or decoded identification data; and
   based at least in part on the result of the comparison and on the user identification data, determine whether the token bearer is to be admitted.

9. The access control system as defined in claim 8, wherein the identification document is a driver license, a credit card, a passport, or a state identification card.

10. The access control system as defined in claim 8, wherein the identification document stores the user identification data in a magnetic stripe, an RFID tag, and/or a hologram.

11. A method of controlling access using a computer-based access control system, the method comprising:
    receiving from a user terminal over a network at the access control system a request from a user for a plurality of access permits for an event, wherein the plurality of access permits are associated with respective different seats;
    providing a user interface via which the user can specify which access permit, associated with a respective identified seat, in the plurality of access permits is to be allocated to which intended recipient, and which access permit, associated with a respective identified seat, is to be allocated to the user;
    providing from the access control system over the network to the user terminal a request that the user provide identification information for the intended recipients of the access permits;
    receiving from the user at the access control system user specified allocations of the plurality of access permits to the respective intended recipients and to the user; and
    enabling the user to transfer one or more access permits in the plurality of access permits, and inhibiting transfer by the user of the access permit allocated to the user.

12. The method as defined in claim 11, wherein the user is requested to provide for the intended recipients corresponding government issued identifiers.

13. The method as defined in claim 11, wherein the user is requested to provide for the intended recipients corresponding government issued identifiers and/or an identifier associated with corresponding intended recipients financial instruments.

14. The method as defined in claim 11, wherein the user is requested to provide for the intended recipients corresponding copies of physical identification instruments.

15. The method as defined in claim 11, wherein the user is requested to provide for the intended recipients corresponding images of identification instruments.

16. The method as defined in claim 11, wherein the user is requested to provide biometric identifiers for the intended recipients.

17. The method as defined in claim 11, the method further comprising providing the access permits to the user and/or the other intended recipients of the access permits, wherein the access permits have a corresponding intended recipient identifier provided thereon.

18. The method as defined in claim 11, the method further comprising providing access permits to the user and/or at least a portion of the other intended recipients of the access permits, wherein the access permits have a corresponding intended recipient machine readable identifier.

19. The method as defined in claim 13, wherein the corresponding intended recipient identifier includes a corresponding recipient's name, and/or a corresponding identifier from a government document and/or a financial instrument.

20. The method as defined in claim 19, wherein the corresponding recipient identifier includes at least a portion of a passport number, at least a portion of a driver license number, and/or at least a portion of an identification card number.

21. The method as defined in claim 19, wherein the financial instrument is a credit card or a debit card.

22. The method as defined in claim 13, wherein the corresponding intended recipient identifier is provided via at least one access permit in encrypted form.

23. The method as defined in claim 13, wherein the corresponding intended recipient identifier is provided via at least one access permit in barcode form.

24. The method as defined in claim 11, wherein the user is permitted to transfer a first number of access permits originally assigned to the user to others within a specified time period.

25. The method as defined in claim 11, wherein the user is authorized to transfer at least one access permit within a designated period of time.

26. The method as defined in claim 25, wherein the designated period of time is a designated period of time related to when the at least one access permit is provided to the user,
wherein the user is permitted to transfer the at least one access permit after a predetermined first time period has elapsed, but not before the predetermined first time period has elapsed.

27. The method as defined in claim 25, wherein the designated period of time is a designated period of time related to a start date for an event for which the at least one access permit grants admittance.

28. The method as defined in claim 11, wherein the user is not authorized to transfer the right to use at least one of the plurality of requested access permits, but at least one other intended recipient is authorized to transfer at least one of the plurality of requested access permits.

29. The method as defined in claim 11, wherein a first of the intended recipients is authorized to transfer at least one access permit via the access control system.

30. The method as defined in claim 29, wherein the first intended recipient is requested to provide identification of a party to whom the at least one access permit is being transferred to.

31. The method as defined in claim 29, wherein the first intended recipient is requested to provide contact information of a party to whom the at least one access permit is being transferred to.

32. The method as defined in claim 29, wherein the first intended recipient is requested to provide an email address of a party to whom the at least one access permit is being transferred to.

33. The method as defined in claim 29, wherein the first intended recipient posts the at least one access permit for sale via the access control system.

34. The method as defined in claim 29, the method further comprising:
receiving a request from the first intended recipient to post the at least one access permit for sale for a first price;
determining if the at least one access permit for sale is eligible for resale; and
at least partly in response to determining that the at least one access permit for sale is eligible for resale, posting the at least one access permit for sale.

35. The method as defined in claim 11, the method further comprising requesting the purchaser to provide contact information, including at least an address, for the intended recipients.

36. The method as defined in claim 35, the method further comprising providing at least one access permit directly to at least one of the intended recipients without first providing the at least one access permit to the user.

37. The method as defined in claim 11, wherein at least one of the plurality of access permits is provided as a physical, hardcopy ticket.

38. The method as defined in claim 11, wherein at least one of the plurality of access permits is transmitted over a network to at least one of the intended recipients.

39. The method as defined in claim 11, wherein at least one of the plurality of access permits is downloadable by at least one of the intended recipients.

40. The method as defined in claim 11, wherein at least one of the plurality of access permits is transmitted to a mobile telecommunications device associated with a intended recipient.

41. The method as defined in claim 11, the method further comprising:
determining if at least a first of the intended recipients is identified in a watch database; and
if the first intended recipient is identified in the watch database, providing a notification to a government entity.

42. The method as defined in claim 41, wherein the notification is automatically provided to the government entity via an electronic message.

43. The method as defined in claim 41, wherein the notification includes identification information related to the first intended recipient and information regarding an event for which the requested access permits are intended for.

44. The method as defined in claim 11, the method further comprising:
determining if at least a first of the intended recipients is identified in a watch database; and
if the first intended recipient is identified in the watch database, not issuing an access permit for the first intended recipient.

45. The method as defined in claim 11, the method further comprising:
determining if at least a first of the intended recipients is identified in a watch database; and
if the first intended recipient is identified in the watch database, inhibiting entry of the first intended recipient to a first event.

46. The method as defined in claim 11, the method further comprising storing access permit inventory information for a first event, the inventory information including information regarding sales of access permits.

47. The method as defined in claim 11, the method further comprising providing a user interface to the user via which the user can indicate whether a first intended recipient of a first access permit is allowed to transfer the first access permit to another via the access control system.

48. The method as defined in claim 11, the method further comprising providing a user interface to the user via which the user can indicate whether a first intended recipient of a first access permit is to be notified that the user will not transfer the first access permit to another via the access control system.

49. A method of controlling access using a computer-based access control system, the method comprising:
  receiving from a user terminal over a network at the access control system a request from a first user for the purchase of a plurality of access permits;
  providing from the access control system over the network to the user terminal a request that the user provide contact information for at least a second user to whom a first of the plurality of access permits is to be provided;
  using the contact information to contact the second user with a request for one or more types of identification, wherein the one or more types of identification include at least one of a government issued identifier, a credit card, or biometric information; and
  at least partly in response to receiving the requested identification corresponding to at least one of the one or more types of identification, for the second user from the second user, providing a first access permit with a unique identifier related to the second user, wherein the unique identifier is machine readable and/or human readable,
  wherein the first user is permitted to transfer a second access permit originally assigned to the first user to others within a specified time period and is not authorized to transfer the second access permit outside of the specified time period.

50. The method as defined in claim 49, wherein the second user is requested to provide a government issued identifier.

51. The method as defined in claim 49, the method further comprising storing the received requested identification in memory, wherein the received requested identification includes a driver license number, a government issued identification card number, a social security number and/or a passport number.

52. The method as defined in claim 49, the method further comprising storing the received requested identification in memory, wherein the received requested identification includes a financial instrument number.

53. The method as defined in claim 49, wherein the second user is requested to provide a copy of a physical identification instrument.

54. The method as defined in claim 49, wherein the received identification includes an image received over the network.

55. The method as defined in claim 49, wherein the received identification includes a biometric identifier.

56. The method as defined in claim 49, wherein the unique identifier includes a barcode.

57. The method as defined in claim 49, wherein the unique identifier is magnetically stored on the first access permit.

58. The method as defined in claim 49, wherein the first access permit is electronically stored in a smart card.

59. The method as defined in claim 49, wherein the first access permit is electronically stored in a mobile phone.

60. The method as defined in claim 49, wherein the first access permit is provided as a physical ticket.

61. The method as defined in claim 49, wherein the first access permit is emailed to the second user using the contact information.

62. The method as defined in claim 49, wherein the first access permit is emailed to the second user.

63. The method as defined in claim 49, wherein the unique identifier is readable by a camera, an optical scanner, and/or a magnetic reader.

64. The method as defined in claim 49, wherein the unique identifier is encrypted.

65. The method as defined in claim 64, the method further comprising:
  receiving from a reader located at a venue a reading of the unique identifier for the first access permit;
  decrypting the unique identifier; and
  causing the decrypted unique identifier to be displayed to an access control person so that the access control person can compare the decrypted unique identifier with physical media presented by the user that contains an un-encrypted version of the unique identifier.

66. The method as defined in claim 49, wherein the designated period of time is a designated period of time related to when the second access permit is provided to the user.

67. The method as defined in claim 49, wherein the designated period of time is a designated period of time related to a start date for an event for which the second access permit grants admittance.

68. The method as defined in claim 49, wherein the first user is not authorized to transfer the right to use a second access permit, but the second user is authorized to transfer the first access permit.

69. The method as defined in claim 49, wherein at least partly in response to receiving a request from the second user to transfer the first access permit to a third user, requesting the second user to provide contact information to the third user.

70. The method as defined in claim 49, wherein the second user posts the first access permit for sale via the access control system.

71. The method as defined in claim 49, the method further comprising providing the first access permit directly to the second user without first providing the first access permit to the first user.

72. The method as defined in claim 49, the method further comprising:
  determining if the second user is identified in a watch database; and
  if the second user is identified in the watch database, providing a notification to a government entity.

73. The method as defined in claim 72, wherein the notification is automatically provided to the government entity via an electronic message.

74. The method as defined in claim 72, wherein the notification includes identification information related to the second user and information regarding an event for which the requested access permits are intended for.

75. The method as defined in claim 49, the method further comprising:
  determining if the second user is identified in a watch database; and
  if the second user is identified in the watch database, not issuing an access permit for the second user.

76. The method as defined in claim 49, the method further comprising:
  determining if the second user is identified in a watch database; and
  if the second user is identified in the watch database, inhibiting entry of the second user to a first event.

77. The method as defined in claim 49, the method further comprising providing a user interface to the first user via which the first user can indicate whether the second user is allowed to transfer the first access permit to another via the access control system.

78. The method as defined in claim 49, the method further comprising providing a user interface to the first user via which the first user can indicate whether the second user is to be notified that the first user will not transfer the first access permit to another via the access control system.

79. The method as defined in claim 49, wherein the first user purchases the first access permit for the second user.

* * * * *

UNITED STATES PATENT AND TRADEMARK OFFICE
CERTIFICATE OF CORRECTION

PATENT NO. : 8,294,549 B2
APPLICATION NO. : 11/744594
DATED : October 23, 2012
INVENTOR(S) : Samovar et al.

Page 1 of 1

It is certified that error appears in the above-identified patent and that said Letters Patent is hereby corrected as shown below:

In column 2 (page 1 item 56) at line 10, Under Other Publications, change "[retrievec119" to --[retrieve c119--.

In column 2 (page 4 item 56) at line 54, Under Other Publications, change "retreived" to --retrieved--.

In column 2 (page 4 item 56) at line 56, Under Other Publications, change "retreived" to --retrieved--.

In column 1 (page 5 item 56) at line 9, Under Other Publications, change "Internate" to --Internet--.

In column 1 (page 5 item 56) at line 10, Under Other Publications, change "Univiersity" to --University--.

In column 11 at line 34, Change "that that" to --that--.

In column 13 at line 52, Change "fiends," to --friends--.

In column 21 at line 21, In Claim 1, change "user user-specified" to --user-specified--.

In column 21 at line 64, In Claim 4, before "a" delete "and".

Signed and Sealed this
Second Day of April, 2013

Teresa Stanek Rea
*Acting Director of the United States Patent and Trademark Office*